(12) United States Patent
Maruyama et al.

(10) Patent No.: US 11,444,912 B2
(45) Date of Patent: Sep. 13, 2022

(54) PARAMETER VALUE ASSIGNMENT USING INPUTTED REQUIREMENTS

(71) Applicant: NEC Corporation, Tokyo (JP)

(72) Inventors: Takashi Maruyama, Tokyo (JP); Takuya Kuwahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/270,570

(22) PCT Filed: Jul. 23, 2019

(86) PCT No.: PCT/JP2019/028820
§ 371 (c)(1),
(2) Date: Feb. 23, 2021

(87) PCT Pub. No.: WO2020/044876
PCT Pub. Date: Mar. 5, 2020

(65) Prior Publication Data
US 2021/0226915 A1 Jul. 22, 2021

(30) Foreign Application Priority Data

Aug. 28, 2018 (JP) .............................. JP2018-158971

(51) Int. Cl.
*H04L 61/5007* (2022.01)
*H04L 61/5061* (2022.01)
*H04L 61/3015* (2022.01)

(52) U.S. Cl.
CPC ...... *H04L 61/2007* (2013.01); *H04L 61/2061* (2013.01); *H04L 61/3015* (2013.01)

(58) Field of Classification Search
CPC ............. H04L 61/2007; H04L 61/2061; H04L 61/3015
(Continued)

(56) References Cited

U.S. PATENT DOCUMENTS 6,356,552 B1 * 3/2002 Foglar .................... H04L 49/30
370/395.1
2018/0129516 A1 * 5/2018 Nakanoya ........... G06F 9/44505

FOREIGN PATENT DOCUMENTS

JP  2014-199478 A  10/2014
JP  2018-093440 A   6/2018
(Continued)

OTHER PUBLICATIONS

International Search Report for PCT Application No. PCT/JP2019/028820, dated Oct. 8, 2019.
(Continued)

*Primary Examiner* — David P Zarka
(74) *Attorney, Agent, or Firm* — Sughrue Mion, PLLC

(57) ABSTRACT

A parameter value assignment device comprises: a memory storing instructions; and processors configured to execute the instructions to: input constraint information indicating constraints and parameter value information indicating parameter value conditions, as requirements related to value assignment to target parameters; decompose target parameters into unit blocks based on the requirements; decompose the constraints into constraints between the unit blocks based on a result of decomposition of the target parameters, and reorganize the constraints between the unit blocks; decompose the parameter value conditions into parameter value conditions for the unit blocks based on the result of decomposition of the target parameters into the unit blocks; and assign a value to each of the target parameters based on the result of decomposition of the target parameters into the unit blocks, the constraints between the unit blocks, and the parameter value conditions for the unit blocks.

10 Claims, 19 Drawing Sheets

(58) Field of Classification Search
USPC .......................................................... 709/245
See application file for complete search history.

(56) References Cited

FOREIGN PATENT DOCUMENTS

| WO | 98/012842 A1 | 3/1998 |
|---|---|---|
| WO | 2016/189834 A1 | 12/2016 |

OTHER PUBLICATIONS

English translation of Written opinion for PCT Application No. PCT/JP2019/028820, dated Oct. 8, 2019.

* cited by examiner

Fig.2

| No | NAME | ATTRIBUTE | PARAMETER LENGTH |
|---|---|---|---|
| 1 | AA | IPv4 ADDRESS | [1,32] |
| 2 | BB | IPv4 ADDRESS | [1,32] |

Fig.3

| No | NAME | PARAMETER DIVISION |
|---|---|---|
| 1 | AA | {16} |
| 2 | BB | {16} |
| 3 | AA | {24} |
| 4 | BB | {24} |

Fig.4

| No | TARGET GROUP | RELATIONSHIP |
|---|---|---|
| 1 | AA[1,24], BB[1,24] | MISMATCH |
| 2 | AA[1,16], BB[1,16] | MATCH |

(a)

| No | CONSTRAINT EQUATION |
|---|---|
| 1 | AA[1,24] ≠ BB[1,24] |
| 2 | AA[1,16] = BB[1,16] |

| No | TARGET | | VALUE |
|---|---|---|---|
| | NAME | RANGE | |
| 1 | AA | [1,16] | 192.168 |
| 2 | BB | [1,16] | 192.168 |
| 3 | AA | [1,24] | 192.168.1~192.168.8 |
| 4 | BB | [1,24] | 192.168.1~192.168.8 |

Fig.6
| No | NAME | PARAMETER DIVISION |
|---|---|---|
| 1 | AA | {16} |
| 2 | BB | {16} |
| 3 | AA | {24} |
| 4 | BB | {24} |
 
| No | DIVISION POSITION |
|---|---|
| 1 | {16} |
| 3 | {24} |
| No | DIVISION POSITION |
|---|---|
| 2 | {16} |
| 4 | {24} |
 
| NAME | DIVISION POSITION |
|---|---|
| AA | {16,24} |
| NAME | DIVISION POSITION |
|---|---|
| BB | {16,24} |
Fig.7
| 1 | | 24 | 25 | 32 | : S1 |
| 1 | 16 | 17 | | 32 | : S2 |
| 1 | 16 | 17 | 24 | 25 | 32 | : SS1 |

| NAME | UNIT BLOCK | |
|---|---|---|
| N | 1 | [1,24] |
|   | 2 | [25,32] |
| M | 1 | [1,16] |
|   | 2 | [17,24] |
|   | 3 | [25,32] |

(b)

| NAME | UNIT BLOCK | |
|---|---|---|
| COMMON TO "N" AND "M" | 1 | [1,16] |
|   | 2 | [17,24] |
|   | 3 | [25,32] |

| NAME | ATTRIBUTE | PARAMETER LENGTH | UNIT BLOCK (PARAMETER DIVISION) | |
|---|---|---|---|---|
| AA | IPv4 ADDRESS | [1,32] | 1 | [1,16] |
| | | | 2 | [17,24] |
| | | | 3 | [25,32] |
| BB | IPv4 ADDRESS | [1,32] | 1 | [1,16] |
| | | | 2 | [17,24] |
| | | | 3 | [25,32] |

(b)

| 1-2 | AA[17,24] ≠ BB[17,24] |
|---|---|
| | AND |
| 2 | AA[1,16] = BB[1,16] |

(c)

| NAME | | RANGE | VALUE |
|---|---|---|---|
| AA | 1 | [1,16] | 192.168 |
| | 2 | [17,24] | 1~8 |
| | 3 | [25,32] | ANY VALUE |
| BB | 1 | [1,16] | 192.168 |
| | 2 | [17,24] | 1~8 |
| | 3 | [25,32] | ANY VALUE |

Fig.15

| NAME | | RANGE | ASSIGNED VALUE |
|---|---|---|---|
| AA | 1 | [1,16] | 192.168 |
| | 2 | [17,24] | 1 |
| | 3 | [25,32] | 1 |
| BB | 1 | [1,16] | 192.168 |
| | 2 | [17,24] | 2 |
| | 3 | [25,32] | 1 |

PARAMETER VALUE ASSIGNMENT USING INPUTTED REQUIREMENTS

This application is a National Stage Entry of PCT/JP2019/028820 filed on Jul. 23, 2019, which claims priority from Japanese Patent Application 2018-158971 filed on Aug. 28, 2018, the contents of all of which are incorporated herein by reference, in their entirety.

TECHNICAL FIELD

The present disclosure relates to a parameter value assignment device and a parameter value assignment method for assigning a value to a parameter to be used in an information technology (IT) system according to a requirement having been input.

BACKGROUND ART

Many parameters are used in IT systems. For example, in an IT system for performing communication via a network, an Internet Protocol (IP) address is assigned to each of components requiring communication, as its own device information. Each component communicates by using the assigned IP address. In the IT system, a parameter for storing the IP address of each component requiring communication is prepared in advance, and a value assigned to the parameter is read at the time of operation, so that assignment is allowed to be performed freely to some extent. A system designer needs to correctly assign values (in the present example, IP addresses) to parameters to be used by the system so that the system shows intended behavior.

However, under the existing circumstances, it is difficult to automate assignment of values and accordingly, values are manually assigned in a case where conditions are complicated. For example in the case where a parameter has a certain degree of freedom while having a specific format, as with an IP address, and there are also constraints between a plurality of the parameters, such as the relationship with the IP addresses of other components.

With respect to determination of system parameters and various setting values, for example, PTL 1 describes a method for grouping specific components in a configuration information setting file of an information system and assigning a parameter unique to the group, such as an IP address to be assigned to a server.

In addition, PTL 2 describes a method for generating appropriate test data even when storage areas to be referred to by a plurality of variables included in branch conditions in a program partially overlap. In the method described in PTL 2, a recording area is divided into a plurality of bit strings for each common variable, and constraint conditions relevant to the bit strings are determined. Thus, even in the case where some of the variables to be used in the branch conditions refer to storage areas partially overlapping, overlapping recording areas are treated as a single symbol, and a condition to be satisfied by each of the variables can be appropriately derived.

CITATION LIST

Patent Literature

[PTL 1] WO 2016/189834
[PTL 2] JP 2014-199478 A

SUMMARY OF INVENTION

Technical Problem

It is considered that the reason why it is difficult to automatically assign IP addresses is that while the overall formats of IP addresses are unified, the formats of individual elements are not unified, so that a specific degree of freedom is allowed between elements included in the IP addresses. With respect to a parameter defined as an aggregate of a plurality of elements for which a certain degree of freedom is allowed under such an overall constraint, a major problem is how to automatically (that is, a designer or the like does not need to specify a value condition for each component one by one for all parameters) assign a correct value representing a behavior intended by a designer while maintaining the degree of freedom.

In the method described in PTL 1, first, a rule to be executed is selected according to rule application order, and then grouping and execution of the rule (determination of elements for each group) is repeated according to the selected rule. The rule includes an item ID to which a parameter is assigned and an item ID serving as a benchmark for the grouping of elements. In addition, the rule may include specifications of a candidate parameter set, an assignment method, and a scope.

However, since the rule is applied to elements one by one in the method described in PTL 1, the method cannot be applied when, for example, elements to be grouped and elements to be grouped into another group have duplicate elements and different assignment methods are used. Therefore, if the method described in PTL 1 is to be applied, it is necessary for the designer to, for example, specify each and every item ID serving as a benchmark for grouping so as to devise a way to avoid using the same item ID as that to be used for other elements (that is, to make an item ID the smallest unit) for all parameters.

In addition, the method described in PTL 2 is a method for generating test data that satisfy a plurality of processing paths according to the number of branch conditions of a program, and the method for dividing a storage area in such a case is not directly applicable to dividing a parameter or grouping elements in the parameter. When a single parameter is to be divided, a plurality of variables that refers to the parameter and is used for branch conditions is not recalled, so that the problem of how to specifically divide the parameter cannot be solved.

In the case where a plurality of constraint conditions is set for some duplicate elements in the same parameter, the following problem arises if the method described in PTL 2 is applied as a method for dividing a parameter that is a common variable to be used for the constraint conditions. That is, the method described in PTL 2 is merely a method for properly dividing a storage area to be referred to by a plurality of variables having a predetermined expression form and a predetermined handling method and appropriately assigning values. In the method, no consideration is given to how to appropriately divide a plurality of parameters the configuration of which is not fixed while meeting constraints between the plurality of parameters or between any elements in the parameters, or meeting value conditions for the parameters or any elements in the parameters. For example, PTL 2 discloses a method for equally dividing the storage area into bit strings that are each consecutive bits the number of which corresponds to the greatest common divisor of per-element bit counts in the respective expression forms of a plurality of variables. However, in the case of parameters as described above, it is not always optimal to equally divide the storage area into bit strings each including bits the number of which corresponds to the greatest common divisor of per-element bit counts in the respective expression forms specified by the constraints.

Therefore, it is an object of the present disclosure to provide a parameter value assignment device and a parameter value assignment method that enable assignment of a value according to a requirement having been input, while maintaining an original degree of freedom even for a parameter the configuration of which is not fixed, such as a parameter including one or more elements having a predetermined degree of freedom in how to divide elements.

Solution to Problem

A parameter value assignment device according to one aspect of the present disclosure includes: a memory storing instructions; and one or more processors configured to execute the instructions to: input constraint information and parameter value information, as requirements related to value assignment to one or more parameters that are target parameters, the constraint information indicating a constraint between the target parameters or between any elements included in the target parameters, the parameter value information indicating parameter value conditions for the target parameters or the any elements; decompose each of the target parameters into one or more unit blocks based on the information input as the requirements; decompose the constraint indicated by the constraint information into constraints between the unit blocks based on a result of decomposition of the target parameters into the unit blocks, and reorganizing the constraints between the unit blocks, subjected to decomposition; decompose the parameter value conditions indicated by the parameter value information as the requirements into parameter value conditions for the unit blocks based on the result of decomposition of the target parameters into the unit blocks; and assign a value to each of the target parameters based on the result of decomposition of the target parameters into the unit blocks, the constraints between the unit blocks, and the parameter value conditions for the unit blocks.

A parameter value assignment method according to one aspect of the present disclosure is a method to be performed by an information processing apparatus, the method including: receiving constraint information and parameter value information input as requirements related to value assignment to one or more parameters that are target parameters, the constraint information indicating a constraint between the target parameters or between any elements included in the target parameters, the parameter value information indicating parameter value conditions for the target parameters or the any elements; decomposing each of the target parameters into one or more unit blocks based on the information input as the requirements; decomposing the constraint indicated by the constraint information into constraints between the unit blocks based on a result of decomposition of the target parameters into the unit blocks, and reorganizing the constraints between the unit blocks, subjected to decomposition; decomposing the parameter value conditions indicated by the parameter value information as the requirements into parameter value conditions for the unit blocks based on the result of decomposition of the target parameters into the unit blocks; and assigning a value to each of the target parameters based on the result of decomposition of the target parameters into the unit blocks, the constraints between the unit blocks, and the parameter value conditions for the unit blocks.

A computer-readable recording medium stores a parameter value assignment program according to one aspect of the present disclosure, the program causing a computer to: receive constraint information and parameter value information input as requirements related to value assignment to one or more parameters that are target parameters, the constraint information indicating a constraint between the target parameters or between any elements included in the target parameters, the parameter value information indicating parameter value conditions for the target parameters or the any elements; decompose each of the target parameters into one or more unit blocks based on the information input as the requirements; decompose the constraint indicated by the constraint information into constraints between the unit blocks based on a result of decomposition of the target parameters into the unit blocks, and reorganize the constraints between the unit blocks, subjected to decomposition; decompose the parameter value conditions indicated by the parameter value information as the requirements into parameter value conditions for the unit blocks based on the result of decomposition of the target parameters into the unit blocks; and assign a value to each of the target parameters based on the result of decomposition of the target parameters into the unit blocks, the constraints between the unit blocks, and the parameter value conditions for the unit blocks.

Advantageous Effects of Invention

According to the present disclosure, an appropriate value can be assigned even to a parameter the configuration of which is not fixed in accordance with a requirement having been input, while maintaining an original degree of freedom.

BRIEF DESCRIPTION OF DRAWINGS

FIG. 2 is an explanatory diagram illustrating an example of parameter information.

FIG. 3 is an explanatory diagram illustrating an example of parameter division information.

FIG. 4 is an explanatory diagram illustrating an example of inter-parameter constraint information.

FIG. 5 is an explanatory diagram illustrating an example of parameter value information.

FIG. 6 is an explanatory diagram illustrating an example of composition of parameter divisions.

FIG. 7 is an explanatory diagram illustrating the composition of the parameter divisions as composition of division positions in a bit string.

FIG. 10 is an explanatory diagram illustrating an example in which two target parameters in a constraint relationship share unit blocks.

FIG. 13 is an explanatory diagram illustrating an example of the result of decomposing requirements.

FIG. 15 is an explanatory diagram illustrating an example of the result of assigning a value to each unit block of target parameters.

EXAMPLE EMBODIMENT

First Example Embodiment

Figure 1:
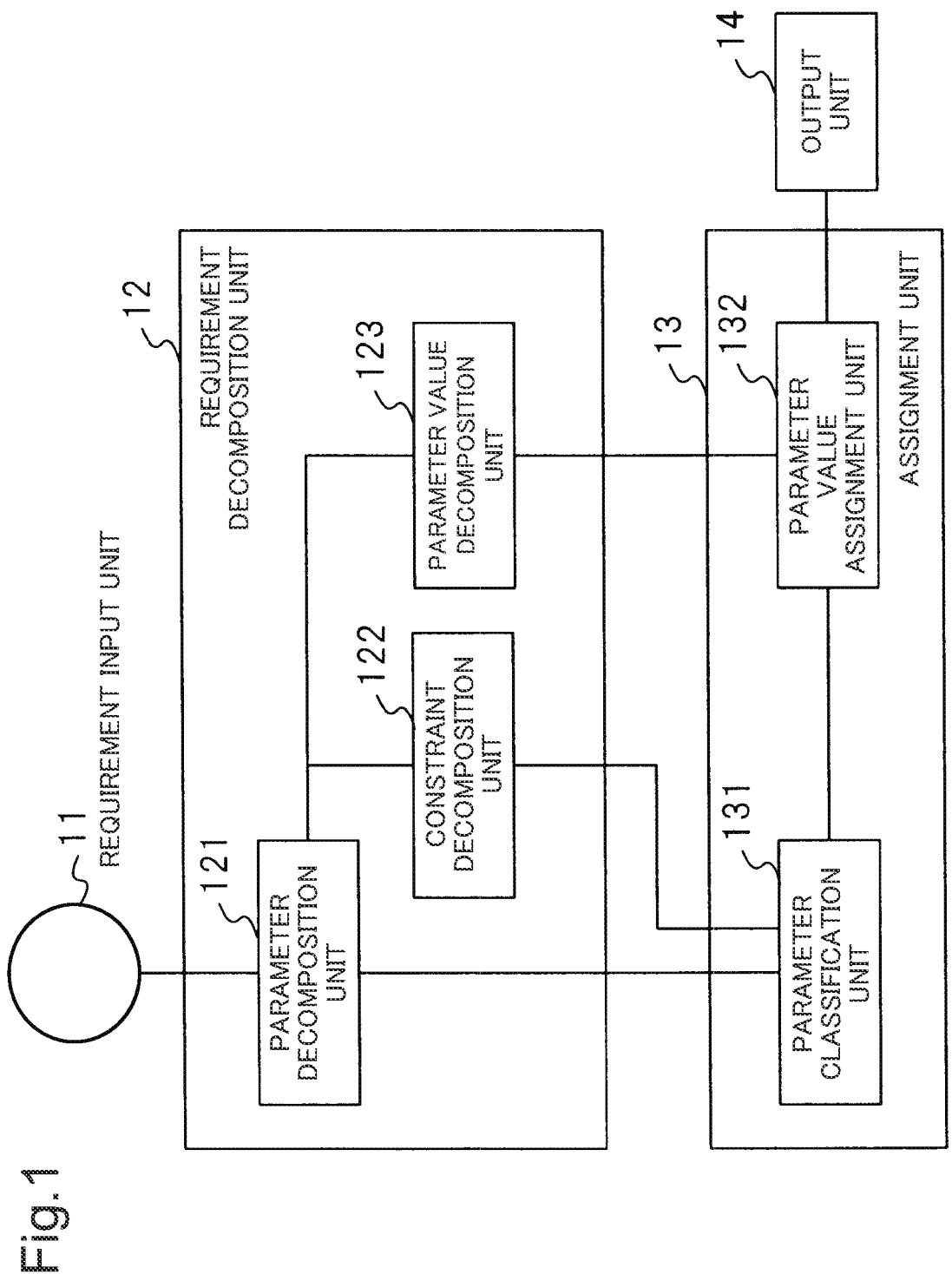
FIG. 1 is a block diagram illustrating a configuration example of a parameter value assignment device according to a first example embodiment.

Example embodiments of the present disclosure will be described below with reference to the drawings. First, a description will be given of a first example embodiment in which a second example embodiment to be described below is described more specifically. FIG. 1 is a block diagram illustrating a configuration example of a parameter value assignment device according to the first example embodiment. A parameter value assignment device 10 illustrated in FIG. 1 includes a requirement input unit 11, a requirement decomposition unit 12, an assignment unit 13, and an output unit 14.

In the present example, the requirement input unit 11 and the requirement decomposition unit 12 are communicably connected. The requirement decomposition unit 12 and the assignment unit 13 are communicably connected. The assignment unit 13 and the output unit 14 are communicably connected.

The requirement input unit 11 inputs requirements for assigning values to one or more parameters to be used by an IT system. For example, parameter information, parameter division information, inter-parameter constraint information, and parameter value information are input as requirements in the present example embodiment.

The parameter information is information on a parameter (referred to as a target parameter) to be assigned a value. The parameter information may include, for example, information indicating what kind of parameter the target parameter is in the IT system and/or information indicating the overall data structure of parameters. The parameter division information is information indicating how a plurality of elements included in the target parameter can be divided (for example, positions at which the elements can be divided). The inter-parameter constraint information is information indicating constraints between target parameters. The constraints indicated by the inter-parameter constraint information is not limited to the constraints between the target parameters, and may include, for example, constraints between elements included in a target parameter. Here, the constraints between elements may be constraints between elements of the same parameter, or may be constraints between elements of different parameters. In any case, the constraints indicated by the inter-parameter constraint information are referred to as "constraints between parameters" hereinafter, but are simply referred to as "constraints" in some cases. The parameter value information is information on a parameter value to be assigned to at least a part of a target parameter.

FIGS. 2 to 5 are explanatory diagrams illustrating examples of requirements to be input. FIG. 2 is an explanatory diagram illustrating an example of the parameter information. FIG. 3 is an explanatory diagram illustrating an example of the parameter division information. FIG. 4 is an explanatory diagram illustrating an example of the inter-parameter constraint information. FIG. 5 is an explanatory diagram illustrating an example of the parameter value information.

The parameter information illustrated in FIG. 2 includes the name, attribute, and length of each target parameter. The name may be any information as long as the information enables each target parameter to be identified at least in the parameter value assignment device 10. For example, in the case where there is a one-to-one correspondence between a target parameter and a device to which the target parameter is applied, the name of the device (a component of the IT system) to which the target parameter is applied may be used as the name of the target parameter. Examples of such device names include "Domain Name System (DNS) server XX", "web server XX", "firewall XX", "router XX", and "network interface card (NIC) XX" (XX are any characters, and the like). If the device to which the target parameter is applied has an identifier such as an ID, the identifier may be used. In the case where there is no one-to-one correspondence between a target parameter and a device to which the target parameter is applied (for example, a plurality of target parameters is assigned to the device.), "device name+parameter type" or the like may be used as the name of the parameter. The names of parameters may be independent of devices to which the parameters are applied, and a unique identifier may be assigned to each target parameter.

The attribute may be a type indicating what kind of parameter the target parameter is. While a case where an IPv4 address is a target parameter is cited below as an example, the target parameter is not limited to an IPv4 address, and may be, for example, an IPv6 address or a Uniform Resource Locator (URL). The attribute can be omitted when what kind of parameter the target parameter is can be specified by the name of the parameter.

The length may be, for example, the total length of the target parameter (in the present example, a bit length). If the target parameter has a variable length, the length may be a range of possible lengths for the target parameter. As well as the total length, the length may be the length of each element in the case where the target parameter includes a plurality of elements.

The parameter division information illustrated in FIG. 3 includes the name of the target parameter and information on parameter division. The name may be, for example, the name of parameter information as long as the target parameter can be identified. In the case where the target parameter includes a plurality of elements, the information on parameter division may be information indicating ranges (division positions) of the elements. For example, parameter division information No. 1 indicates that a parameter having the name "AA" (32-bit long IPv4 address) is to be divided in a target system with the upper 16 bits as a single unit (element). In addition, for example, parameter division information No. 3 indicates that the parameter having the name "AA" (32-bit long IPv4 address) is to be divided in the target system with the upper 24 bits as a single unit (element).

The present example is based on the assumption that the parameter division information is input as a requirement. However, the parameter division information may be generated by the parameter value assignment device based on a division position (target range, or the like) of the parameter indicated in the inter-parameter constraint information and/or the parameter value information to be described below.

The inter-parameter constraint information illustrated in FIG. 4 includes a target group having a constraint relationship (a set of targets specified by the names of parameters and target ranges in the parameters) and a constraint (relationship between the targets) to be applied to the target group. As illustrated in (a) of FIG. 4, each item of the inter-parameter constraint information may be registered independently, or may be registered in the form of a constraint equation between parameters for which a target range has been defined as illustrated in (b) of FIG. 4.

For example, inter-parameter constraint information No. 1 indicates that the upper 24 bits differs between the parameter having the name "AA" and a parameter having the name "BB". Note that details of a constraint (relationship between the parameters described above) are not limited to two types of relationships such as an equal relationship (equal) and unequal relationship (not equal), and may also include a magnitude relationship as represented by an inequality sign. It is also possible to register two or more constraints having different target ranges for the same combination of parameters, such as the inter-parameter constraint information No. 1 and No. 2.

The parameter value information illustrated in FIG. 5 includes the name of a target parameter, a target range where a value is assigned in the target parameter (position information on a position as a target where the value is assigned in the parameter), and conditions (for example, a set of values that can be assigned or cannot be assigned to the target) of the parameter value to be assigned to the target.

For example, parameter value information No. 1 indicates that the upper 16 bits of the parameter having the name "AA" (32-bit long IPv4 address) can take the value "192.168". The target "[1, 16]" in the drawing indicates that the value is to be assigned to the upper 16 bits in the target parameter. For example, parameter value information No. 3 indicates that the upper 24 bits of the parameter having the name "AA" (32-bit long IPv4 address) can take any value in the range of "192.168.1 to 192.168.8". The target "[1, 24]" in the drawing indicates that the value is to be assigned to the upper 24 bits in the target parameter. The format of data in the parameter value information is not limited to a parameter having an order relation, such as an IP address. For example, a parameter such as a URL can also be specified. The parameter value is not limited to a numeral.

It is also possible to register parameter value information including a duplicate part as an assignment target for a single target parameter, as in the case of No. 1 and No. 3 or the case of No. 2 and No. 4 in the drawing. While it is desirable that the same parameter value is registered for the duplicate part in the ranges of assignment targets (in the present example, the upper 16-bit part), values to be assigned do not need to completely match, and may partially match (for example, may be a value included in a set of candidates for one of parameter values). If even a partial match is not found (completely different), an error indication showing to that effect may be provided, or a value may be determined in accordance with a predetermined registration priority.

The requirement decomposition unit 12 decomposes a requirement having been input, into requirements associated with the unit blocks to be described below. The requirement decomposition unit 12 performs processing for combining the divisions (more specifically, division positions defining the target range in the parameter) of the target parameter on the basis of at least the division position of the parameter indicated by the parameter division information, decomposing the parameter into unit blocks serving as units of value assignment on the basis of the combined parameter divisions, and decomposing the specifications of the constraint and the parameter value into segments associated with the unit blocks according to the result of the decomposition. Hereinafter, combining such decomposition of parameters and decomposing the specifications of the constraint and the parameter value into segments associated with the unit blocks of the decomposed parameter may be referred to as reconstructing requirements or unit block decomposition of requirements.

As illustrated in FIG. 1, the requirement decomposition unit 12 may include a parameter decomposition unit 121, a constraint decomposition unit 122, and a parameter value decomposition unit 123. In such a case, the parameter decomposition unit 121 may be communicably connected to the requirement input unit 11, the constraint decomposition unit 122, the parameter value decomposition unit 123, and the assignment unit 13. The constraint decomposition unit 122 may be communicably connected to the parameter decomposition unit 121 and the parameter classification unit 131. The parameter value decomposition unit 123 may be communicably connected to the parameter decomposition unit 121 and the assignment unit 13.

The parameter decomposition unit 121 decomposes the target parameters into unit blocks serving as units of value assignment in which the constraint relationship between parameters is taken into consideration, on the basis of the requirements having been input. More specifically, the parameter decomposition unit 121 combines the parameter divisions on the basis of the division positions of the target parameters indicated by the requirements having been input, and decomposes each of the target parameters into one or more unit blocks according to the combined parameter divisions.

Here, more specifically, the term "composition of divisions" regarding parameters refers to composition of division positions. For example, the parameter decomposition unit 121 can combine the decomposition of parameters by performing a union operation of all the division positions specified for each target parameter based on the parameter division information, the constraint information, and the parameter value information classified by target parameter. The parameter decomposition unit 121 may rewrite the parameter division information by treating each of the division positions subjected to the union operation as a single parameter division. Each block in the target parameter indicated by the parameter division information rewritten in this way serves as a unit of value assignment. This rewriting process may be a process of integrating pieces of parameter division information into a single piece of parameter division information for each target parameter by merging pieces of division position information, which each indicates where a parameter is to be divided, in pieces of parameter division information each including one or more pieces of the division position information having been specified.

In the present disclosure, dividing a single parameter into one or more unit blocks based on the result of composition of the parameter divisions indicated by the requirements having been input is referred to as "decomposition of parameters".

As described above, when the parameter division information is not input as a requirement, the parameter decomposition unit 121 may generate parameter division information indicating, as a requirement, a parameter division position for each target parameter based on the inter-parameter constraint information or the parameter value information, and then perform the same processing.

FIG. 6 is an explanatory diagram illustrating an example of composition of parameter divisions. As illustrated in FIG. 6, first, the parameter decomposition unit 121 collects the division positions of the parameters specified as requirements, and classifies the collected division positions by target parameter. Next, the parameter decomposition unit 121 performs a union operation of the division positions classified by target parameter, and rewrites the parameter division information in accordance with each division position included in the union. Each of divided blocks indicated by the rewritten parameter division information serves as a unit block.

In the present example, for each of the target parameters "AA" and "BB" of 32 bits in total, a parameter division in which the target parameter is divided at a 24th-highest bit is combined with a parameter division in which the target parameter is divided at a 16th-highest bit. As a result, the parameter division information is rewritten in such a way that the rewritten parameter division information indicates that the target parameters are each divided both at the 16th bit and the 24th bit. The example of composition of parameter divisions illustrated in FIG. 6 has been represented as composition of division positions in a bit string in FIG. 7. In FIG. 7, S1 represents a first parameter division in the relevant parameter, S2 represents a second parameter division, and SS1 represents the combined parameter divisions. The parameter division information rewritten in this way indicates that the target parameter is decomposed into a first unit block containing first to 16th bits, a second unit block containing 17th to 24th bits, and a third unit block containing 25th to 32nd bits, as represented by the combined parameter divisions.

Figure 8:
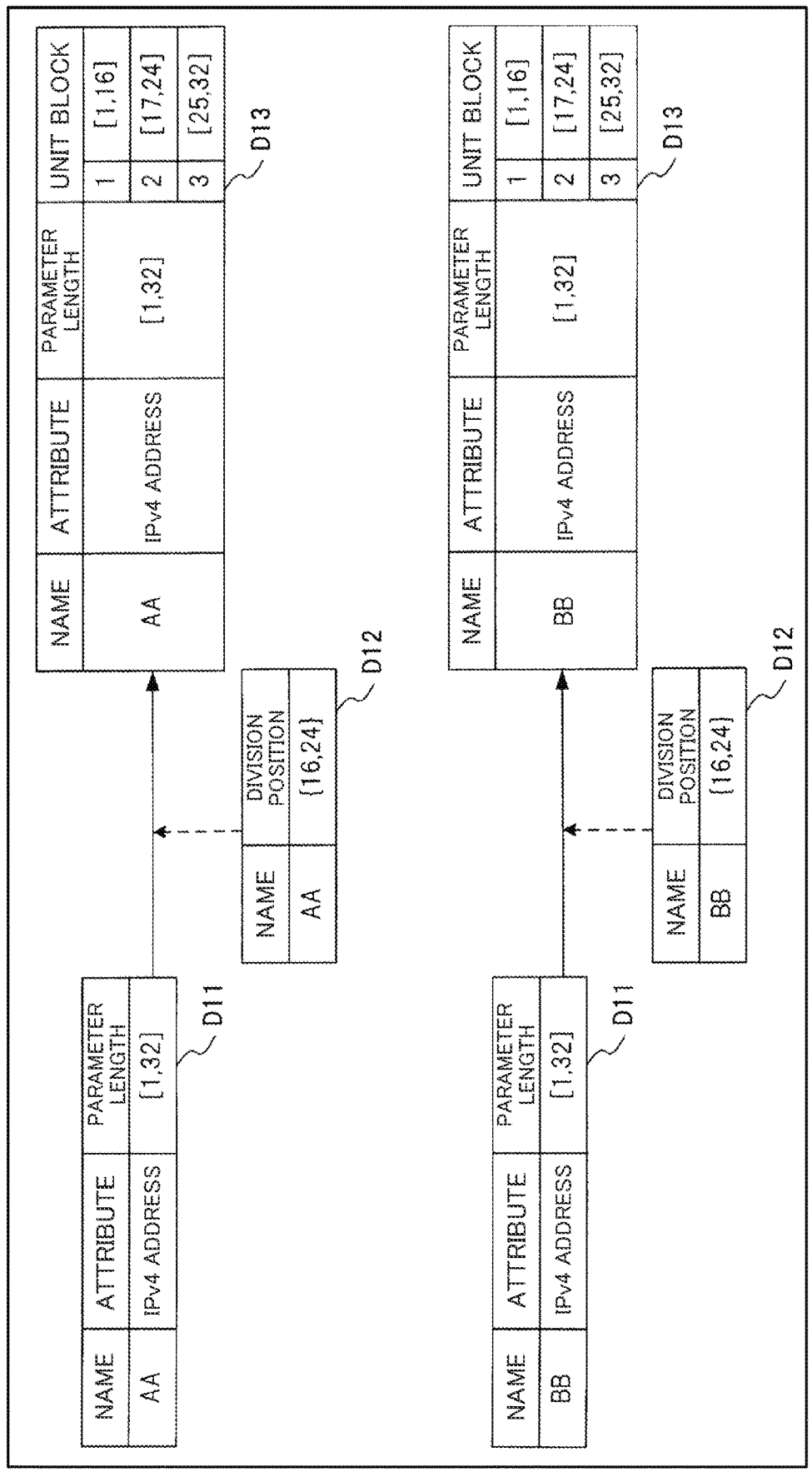
FIG. 8 is an explanatory diagram illustrating examples of the results of decomposing parameters.

FIG. 8 is an explanatory diagram illustrating examples of the results of decomposing parameters. For example, in the case of the target parameters "AA" and "BB" illustrated in FIG. 2, the parameter decomposition unit 121 just needs to decompose each of the target parameters into the three unit blocks of the first unit block containing the first to 16th bits, the second unit block containing the 17th to 24th bits, and the third unit block containing the 25th to 32nd bits, based on the parameter division information after composition illustrated in FIG. 6. In FIG. 8, D11 represents original parameter information, D12 represents parameter division information after composition, and D13 represents parameter information after decomposition based on the parameter division information after composition.

In the case of a parameter the length of which is not fixed, it is possible to specify delimiter information, the order (the range of ordinal positions from the top), or the like as information indicating a division position, instead of the bit length. For example, in the case of a URL, it is possible to specify that a segment between the top and a first delimiter is defined as a first unit block and a segment between the first delimiter and a second delimiter is defined as a second unit block.

The constraint decomposition unit 122 decomposes the inter-parameter constraint on the basis of parameter division information indicating combined parameter divisions or parameter information after decomposition. More specifically, the constraint decomposition unit 122 decomposes the inter-parameter constraint indicated in the inter-parameter constraint information in such a way that the constraint between parameters is specified for each unit block. The constraint decomposition unit 122 just needs to decompose constraints by using a constraint expansion rule.

Figure 9:
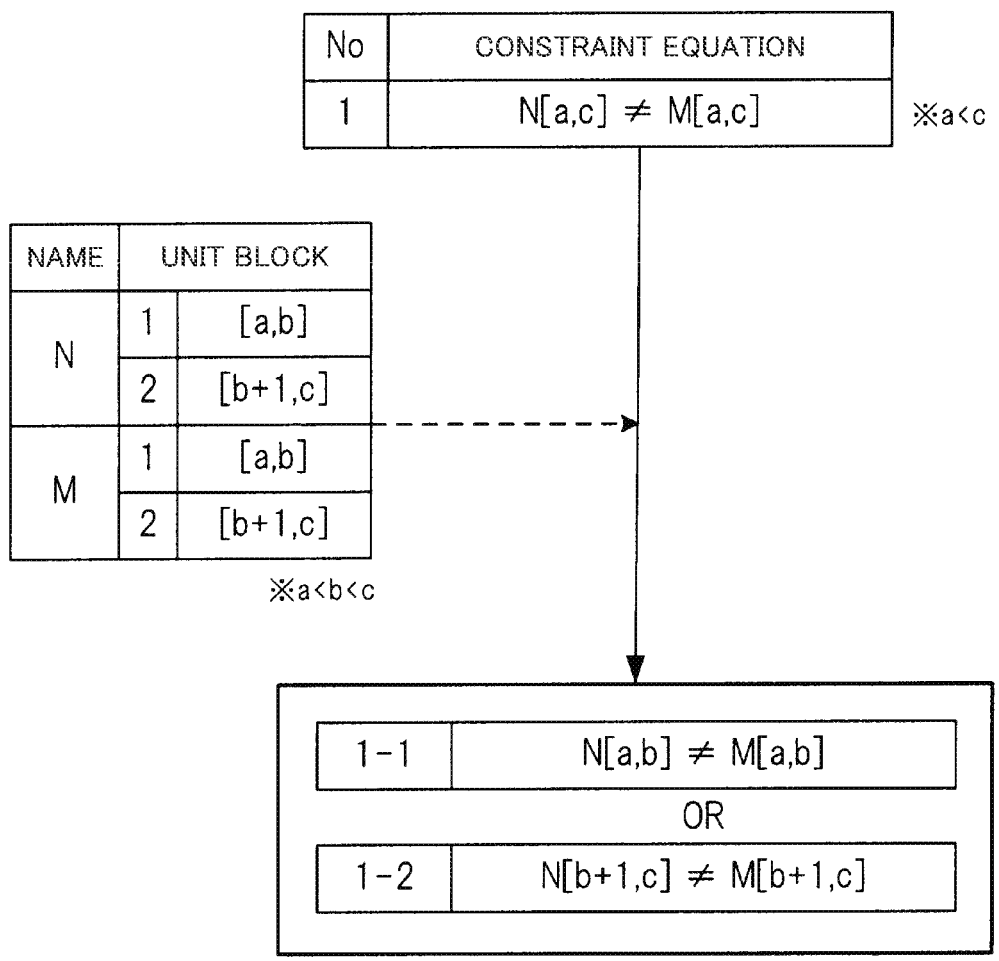
FIG. 9 is an explanatory diagram illustrating an example of a constraint expansion rule to be used for decomposition of an inter-parameter constraint.

FIG. 9 is an explanatory diagram illustrating an example of a constraint expansion rule to be used for decomposition of an inter-parameter constraint. The example illustrated in FIG. 9 is an example of a constraint expansion rule for decomposing a constraint set between parameters "N" and "M" with a range of "a" to "c" in each parameter, into constraints in units of unit blocks. At this time, information on the decomposed parameters indicates that the parameters "N" and "M" each include a first unit block with a range of "[a, b]" and a second unit block with a range of "[b+1, c]".

In the present example, inter-parameter constraint No. 1 with the range of "a" to "c" is decomposed into a plurality of constraints to be connected by logical OR in such a way that either inter-parameter constraint No. 1-1 with a range of "a" to "b" or inter-parameter constraint No. 1-2 is satisfied.

While the example illustrated in FIG. 9 is based on the assumption that target parameters in a constraint relationship are divided into unit blocks at the same division positions, the target parameters in a constraint relationship may be divided into unit blocks at different division positions. In such a case, the constraint decomposition unit 122 just needs to further combine the parameter divisions of the target parameters, determine a unit block division position common to the target parameters, and decompose the constraint based on the common unit block decomposition position.

FIG. 10 is an explanatory diagram illustrating an example in which two target parameters in a constraint relationship share unit blocks. The example (a) in FIG. 10 is an explanatory diagram illustrating an example of unit blocks before being shared by two target parameters. The example (b) in FIG. 10 is an explanatory diagram illustrating an example of the unit blocks shared by the two target parameters. The parameter decomposition unit 121 may perform the process of causing the unit blocks to be shared by the parameters in such a constraint relationship.

Figure 11:
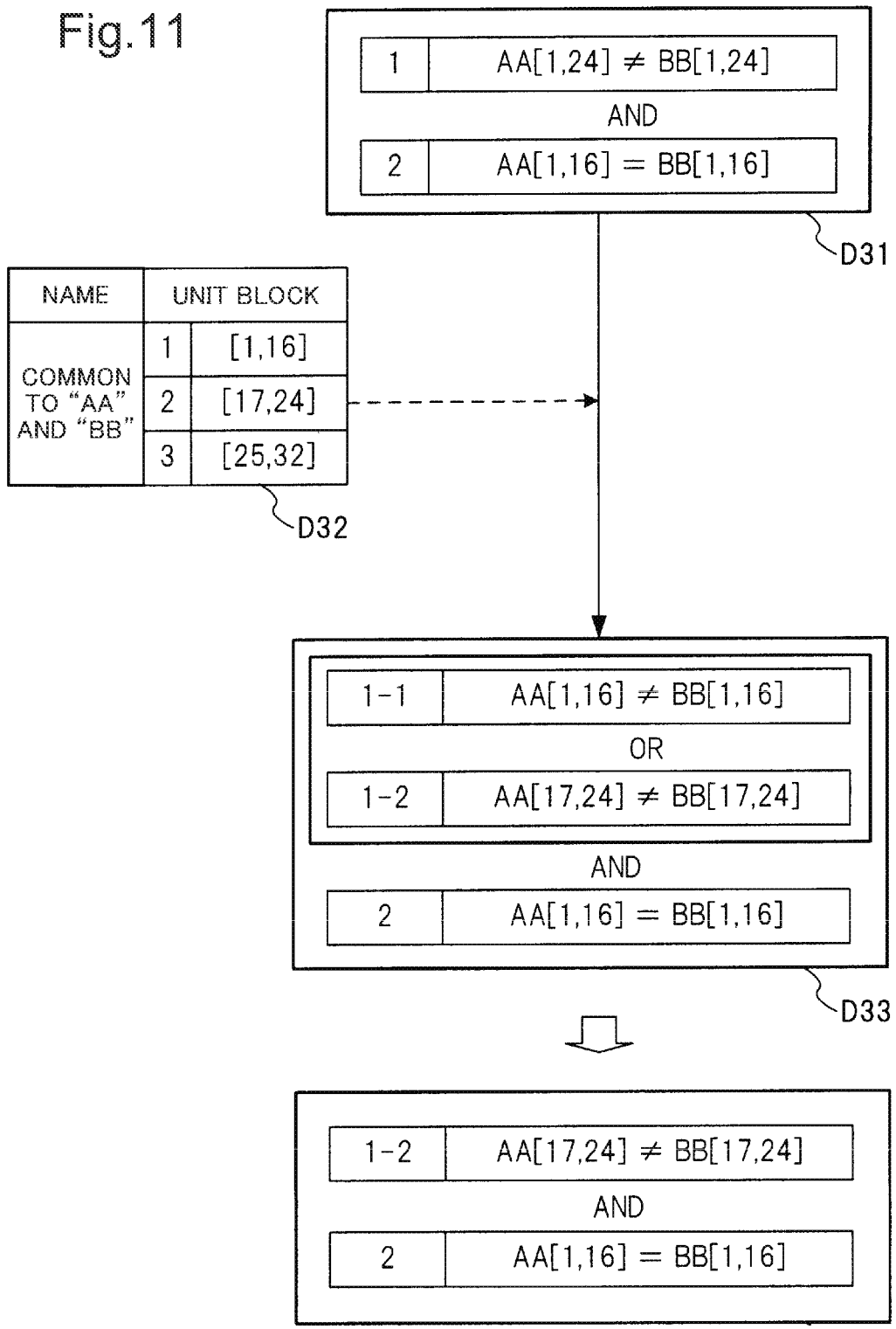
FIG. 11 is an explanatory diagram illustrating an example of the result of decomposing inter-parameter constraints.

FIG. 11 is an explanatory diagram illustrating an example of the result of decomposing the inter-parameter constraints illustrated in (b) of FIG. 4. In the example illustrated in FIG. 11, one of the constraints between the parameters "AA" and "BB", that is, a constraint No. 1 is decomposed into constraints between two unit blocks and then, the resulting constraints are summarized in such a way that a constraint No. 1-2 and a constraint No. 2 are finally obtained. In this way, in the case where a conflict occurs when the decomposed constraint is combined with the existing constraint, the constraints are reorganized (summarized) to obtain a consistent combination.

The parameter value decomposition unit 123 decomposes a parameter value (more specifically, a parameter value indicated by a parameter value condition) on the basis of the parameter division information indicating combined parameter divisions or the parameter information after decomposition. More specifically, the parameter value decomposition unit 123 decomposes the parameter value indicated by the parameter value information in such a way that a parameter value condition is specified for each unit block.

Figure 12:
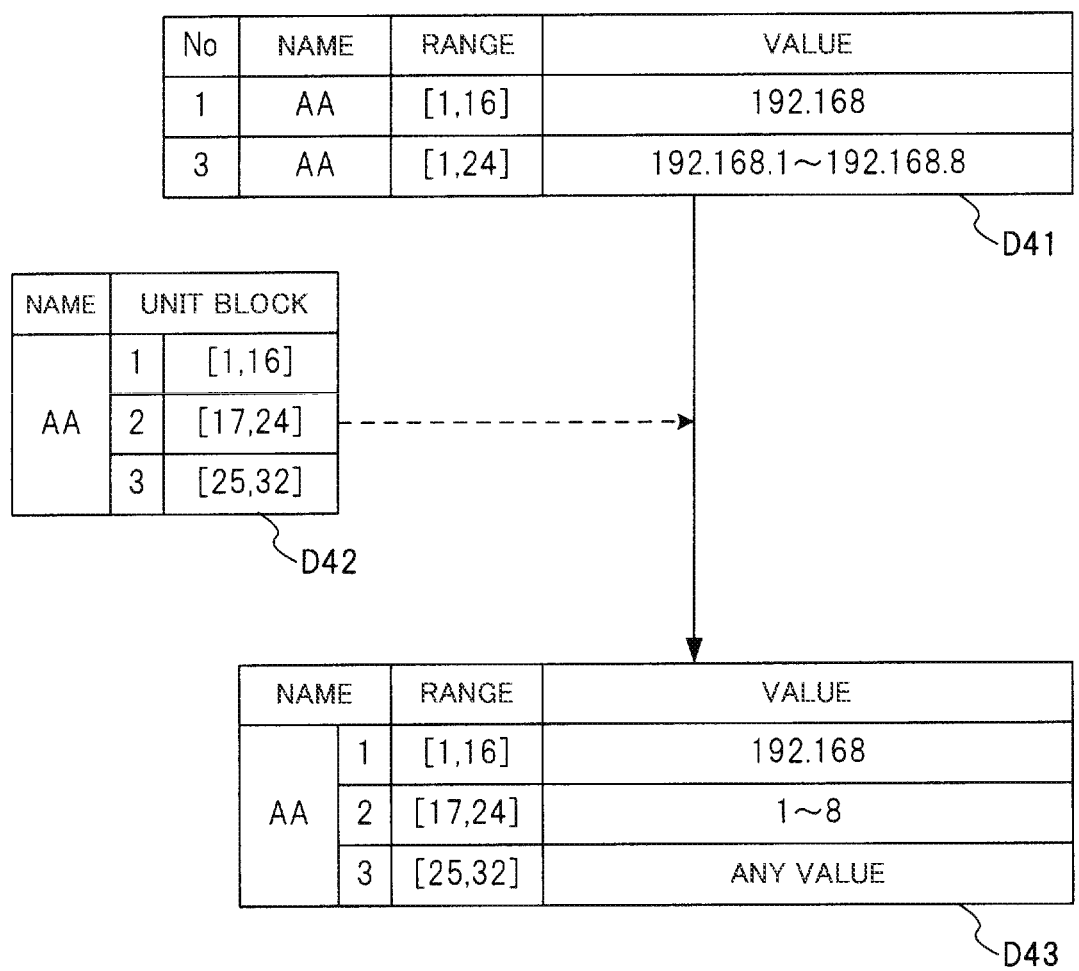
FIG. 12 is an explanatory diagram illustrating an example of the result of decomposing parameter values.

FIG. 12 is an explanatory diagram illustrating an example of the result of decomposing parameter values. In the example illustrated in FIG. 12, the parameter value for the parameter "AA" at least for a range of first to 24th bits is decomposed into the parameter value "192.168" for the first unit block and the parameter value "1 to 8" for the second unit block, based on the parameter value information No. 1 specifying the parameter value "192.168" for a range of first to 16th bits and the parameter value information No. 3 specifying the parameter value "192.168.1 to 192.168.8" for the range of first to 24th bits. FIG. 12 also illustrates information on a unit block in which no parameter value condition has been set, that is, any value can be taken according to an attribute.

FIG. 13 is an explanatory diagram illustrating an example of the result of decomposing requirements. In the drawing, (a) is an example of unit block decomposition of parameter information, (b) is an example of unit block decomposition of an inter-parameter constraint, and (c) is an example of unit block decomposition of a parameter value.

The assignment unit 13 assigns a value to the target parameter on the basis of the requirements (parameter information, inter-parameter constraint information, and parameter value information) decomposed by the requirement decomposition unit 12 in such a way as to be associated with the unit blocks. In the present example embodiment, since the requirements input to the assignment unit 13 have already been decomposed by the requirement decomposition unit 12 into requirements associated with the unit blocks, the assignment unit 13 just needs to assign a value to each unit block in the target parameter according to the decomposed requirements having been input.

As illustrated in FIG. 1, the assignment unit 13 may include a parameter classification unit 131 and a parameter value assignment unit 132. In such a case, the parameter classification unit 131 may be communicably connected to the parameter decomposition unit 121, the constraint decomposition unit 122, and the parameter value assignment unit 132. The parameter value assignment unit 132 may be communicably connected to the parameter classification unit 131 and the parameter value decomposition unit 123.

The parameter classification unit 131 classifies unit blocks of each target parameter in such a way that unit blocks in a constraint relationship are classified into the same group, in accordance with requirements decomposed in such a way as to be associated with the unit blocks. At this time, the parameter classification unit 131 classifies unit blocks in such a way that unit blocks in an equal relationship are put together into one group and unit blocks in an unequal relationship are put into different groups. The parameter classification unit 131 may connect groups in an unequal relationship to each other with a link indicating that the groups are not equal. In the case where a magnitude relationship is set in addition to the equal relationship and the unequal relationship, the parameter classification unit 131 may classify unit blocks in an unequal relationship into different groups and add information indicating the magnitude relationship between the groups. The parameter classification unit 131 may exclude unit blocks having no constraint relationship with any other unit block from the object of classification, or may classify such unit blocks into one or more groups. The Unionfind algorithm can be cited as an example of a method for implementing the classification of unit blocks of parameters. In this case, the result of classification is output to the parameter value assignment unit 132, as a graph showing the relationship between unit blocks of different parameters.

Figure 14:
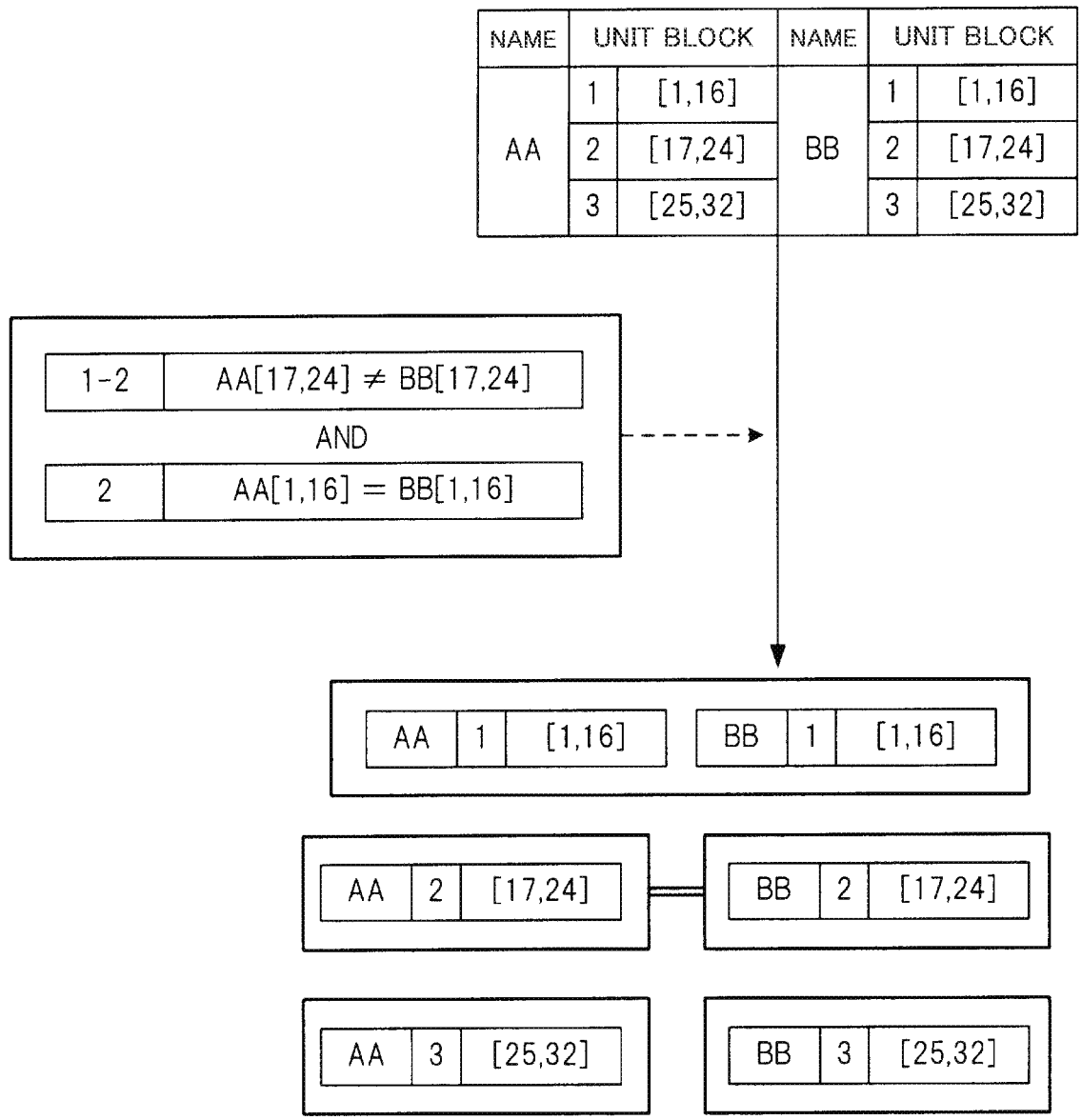
FIG. 14 is an explanatory diagram illustrating an example of the result of classifying unit blocks of parameters.

FIG. 14 is an explanatory diagram illustrating an example of the result of classifying unit blocks of parameters. For example, in the example illustrated in FIG. 14, the first unit block (first to 16th-bit part) of the parameter "AA" and the first unit block (first to 16th-bit part) of the parameter "BB" are classified into the same group. Meanwhile, the second unit block (17th to 24th-bit part) of the parameter "AA" and the second unit block (17th to 24th-bit part) of the parameter "BB" are classified into different groups. The third unit block (25th to 32nd-bit part) of the parameter "AA" and the third unit block (25th to 32nd-bit part) of the parameter "BB" may be classified into the same group or into different groups. Thick frames represent groups, and a double line between groups indicates that the groups have different values, in the drawing. In the case where there is no connection line between groups, it means that there is no constraint between the groups.

The parameter value assignment unit 132 assigns values to a group of unit blocks classified by the parameter classification unit 131, on the basis of the decomposed inter-parameter constraints and parameter values (that is, constraints between unit blocks and parameter values associated with the unit blocks). A graph coloring algorithm can be cited as an example of a method for implementing assignment of values to unit blocks of parameters. For example, the parameter value assignment unit 132 may assign the same value to all the unit blocks in the group of unit blocks put together as a result of classification, according to a predetermined method.

FIG. 15 is an explanatory diagram illustrating an example of the result of assigning a value to each unit block of target parameters. FIG. 15 illustrates an example in which the parameter value "192.168" has been assigned to the first unit block of the parameter "AA", the parameter value "1" has been assigned to the second unit block, and the parameter value "1" has been assigned to the third unit block. FIG. 15 also illustrates an example in which the parameter value "192.168" has been assigned to the first unit block of the parameter "BB", the parameter value "2" has been assigned to the second unit block, and the parameter value "1" has been assigned to the third unit block.

Figure 16:
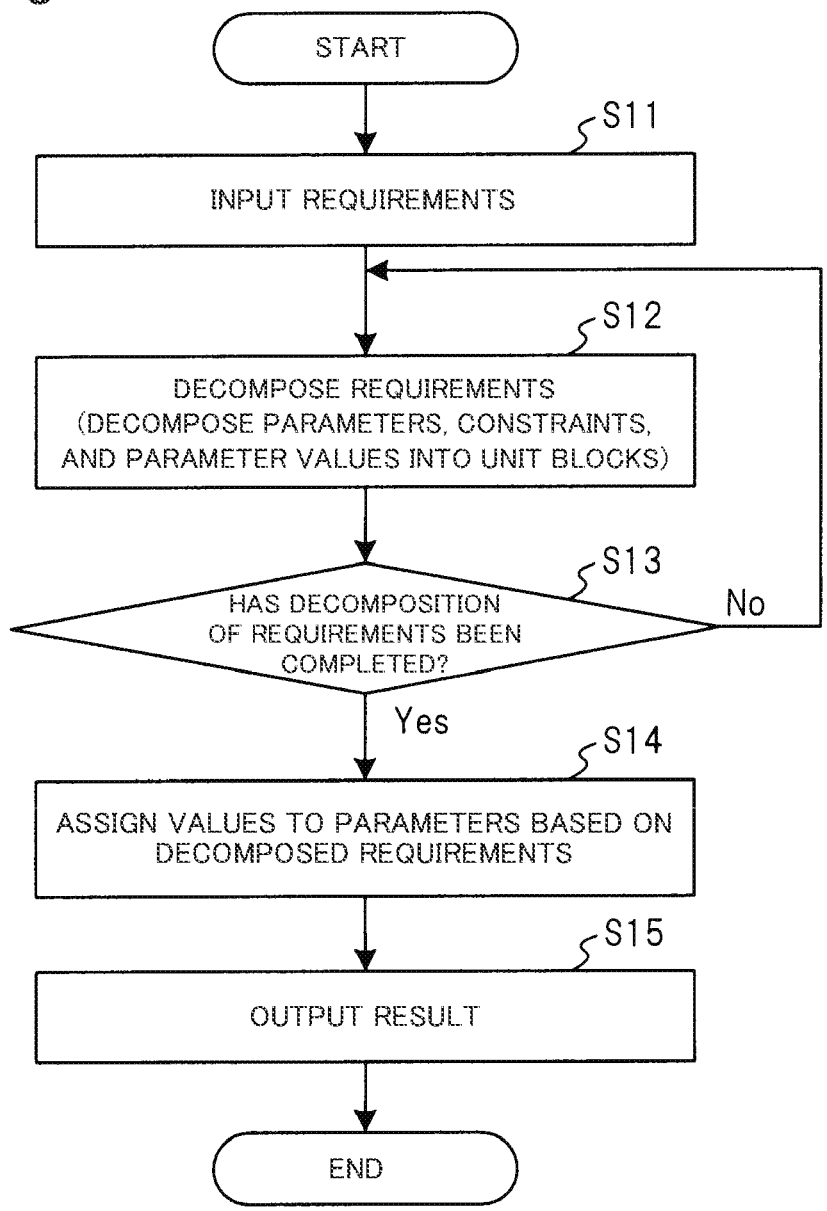
FIG. 16 is a flowchart illustrating an example of operation of the parameter value assignment device according to the first example embodiment.

Next, operation of the present example embodiment will be described. FIG. 16 is a flowchart illustrating an example of operation of the parameter value assignment device according to the first example embodiment. In the example illustrated in FIG. 16, first, the requirement input unit 11 inputs requirements for assigning values to one or more parameters to be used by the IT system (step S11: input of requirements). The requirement input unit 11 inputs at least parameter information, inter-parameter constraint information, and parameter value information as requirements. The requirement input unit 11 may also input parameter division information as a requirement.

Next, the requirement decomposition unit 12 decomposes the requirements having been input, into requirements associated with unit blocks (step S12: decomposition of requirements). For example, the requirement decomposition unit 12 combines divisions of a target parameter indicated by the requirements having been input, and decomposes the target parameter, and an inter-parameter constraint and a parameter value related to the target parameter on the basis of the combined parameter divisions, for all the target parameters.

When decomposition of all the requirements is completed for all the target parameters (Yes in step S13), the assignment unit 13 assigns values to the target parameters based on the decomposed requirements (step S14: assignment of parameter values). The assignment unit 13 just needs to assign values to all the unit blocks of all the target parameters according to the requirements decomposed in such a way as to be associated with the unit blocks. Thus, the values are assigned to the target parameters.

If decomposition of all the requirements has not been completed (No in step S13), the parameter value assignment device 10 just needs to return to step S12 and decompose remaining requirements. The parameter value assignment device 10 may determine whether decomposition of all the requirements has been completed, based on whether all the requirements input in step S11 have been specified in such a way as to be associated with the unit blocks.

Finally, the output unit 14 outputs the result of assignment performed by the assignment unit 13 (step S15).

Figure 17:
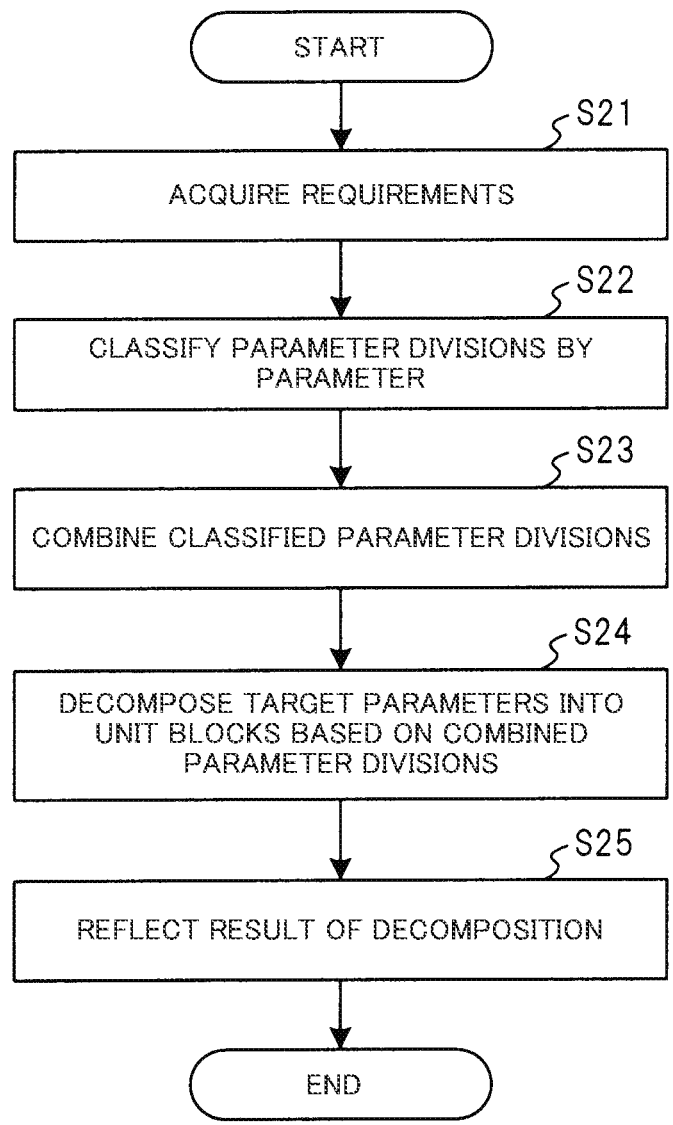
FIG. 17 is a flowchart illustrating a more detailed example of parameter decomposition operation to be performed by a parameter decomposition unit 121.

FIG. 17 is a flowchart illustrating a more detailed example of parameter decomposition operation to be performed by the parameter decomposition unit 121. The operation illustrated in FIG. 17 corresponds to a part of the requirement decomposition operation in step S12 described above.

In the example illustrated in FIG. 17, first, the parameter decomposition unit 121 acquires the requirements having been input (step S21). In step S21, the parameter decomposition unit 121 receives, as inputs from a user, parameter information, parameter division information, inter-parameter constraint information, and parameter value information. These pieces of information are examples of input information, and the present disclosure is not limited thereto.

Next, the parameter decomposition unit 121 classifies all the pieces of acquired information by parameter, and extracts parameter divisions for each parameter (step S22). The parameter divisions to be classified here are not limited to divisions of parameters indicated in the parameter division information, and may also include, for example, divisions of parameters indicated by a target range or the like in the inter-parameter constraint information or parameter value information.

The parameter decomposition unit 121 may, for example, classify the parameter division information, the inter-parameter constraint information, and the parameter value information by parameter, and extract a parameter division indicating a decomposition position of each parameter from the parameter division information, inter-parameter constraint information, and parameter value information classified by parameter. With regard to the classification of parameters, for example, pieces of information containing the same identifier may be put together into one group with reference to an identifier such as the name of a parameter contained in each piece of information. In such a case, the inter-parameter constraint information belongs to at least two groups.

For example, when the pieces of information illustrated in FIGS. 3 to 5 are classified by name, the parameter division information No. 1 and No. 3 in FIG. 3, the inter-parameter constraint information No. 1 and No. 2 in FIG. 4, and the parameter value information No. 1 and No. 3 in FIG. 5 are classified as information related to a single parameter (parameter "AA"). In addition, the parameter division information No. 2 and No. 4 in FIG. 3, the inter-parameter constraint information No. 1 and No. 2 in FIG. 4, and the parameter value information No. 2 and No. 4 in FIG. 5 are classified as information related to a single parameter (parameter "BB"). Based on these pieces of classified information, the parameter decomposition unit 121 extracts the division positions "{16}" and "{24}" as parameter divisions of the parameter "AA" and the division positions "{16}" and "{24}" as parameter divisions of the parameter "BB".

In the case where the parameter divisions in the inter-parameter constraint information and the parameter value information are aggregated in the parameter division information input as a requirement, the parameter decomposition unit 121 may classify only the parameter division information by parameter.

Next, the parameter decomposition unit 121 combines the extracted parameter divisions for each target parameter (step S23). The parameter decomposition unit 121 just needs to combine the parameter divisions by performing a union operation of all the division positions of the relevant parameter as described above.

Next, the parameter decomposition unit 121 redivides the parameters based on the combined parameter divisions, and decomposes the target parameters into unit blocks (step S24).

For example, assume that parameter divisions indicating the division positions "{16}" and "{24}" are obtained as the combined parameter divisions for the parameter "AA". In such a case, the parameter decomposition unit 121 divides the parameter "AA" at the division positions, and decomposes the parameter "AA" into three unit blocks.

Finally, the parameter decomposition unit 121 reflects the result of decomposition in the parameter information and the parameter division information, and the process ends (step S25). The parameter decomposition unit 121 performs a series of such processing steps for all the classified parameters.

The parameter information and the parameter division information in which the result of decomposition has been reflected are output to the constraint decomposition unit 122, the parameter value decomposition unit 123, and the parameter classification unit 131. At this time, the parameter decomposition unit 121 may output the inter-parameter constraint information input as a requirement, to the constraint decomposition unit 122 together with the parameter information and the parameter division information. Similarly, the parameter decomposition unit 121 may output the parameter value information input as a requirement, to the parameter value decomposition unit 123 together with the parameter information and the parameter division information. The requirement input unit 11 may output the inter-parameter constraint information to the constraint decomposition unit 122 and output the parameter value information to the parameter decomposition unit 121.

Figure 18:
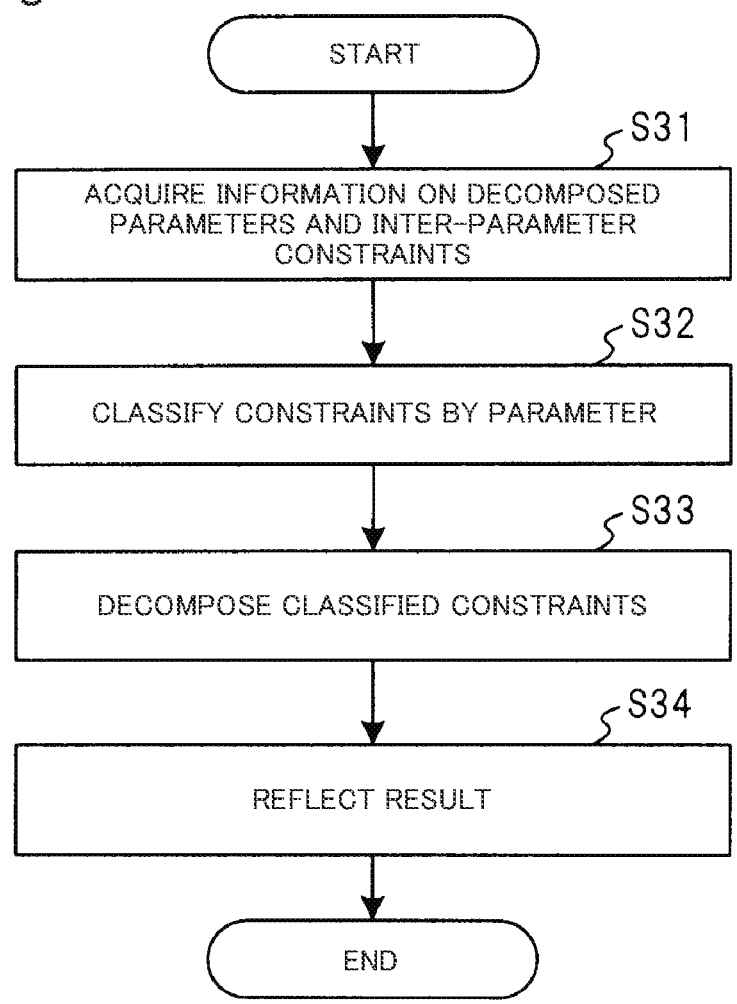
FIG. 18 is a flowchart illustrating a more detailed example of decomposition operation of an inter-parameter constraint to be performed by a constraint decomposition unit 122.

FIG. 18 is a flowchart illustrating a more detailed example of decomposition operation of an inter-parameter constraint to be performed by the constraint decomposition unit 122. The operation illustrated in FIG. 18 corresponds to a part of the requirement decomposition operation in step S12 described above.

In the example illustrated in FIG. 18, first, the constraint decomposition unit 122 acquires, as inputs, parameter information or parameter division information in which the result of decomposition of parameters into unit blocks has been reflected, and inter-parameter constraint information before decomposition (step S31).

Next, the constraint decomposition unit 122 classifies all the pieces of inter-parameter constraint information by combination of target parameters in a constraint relationship (step S32). In the case where the inter-parameter constraint information is expressed by a constraint equation, the constraint decomposition unit 122 just needs to classify the inter-parameter constraint information in such a way that pieces of the inter-parameter constraint information in which sets of parameters on the right and left sides coincide with each other are put together into one group. For example, if pieces of the inter-parameter constraint information are registered for a combination of the parameters "AA" and "BB", the constraint decomposition unit 122 groups pieces of the inter-parameter constraint information of the same combination together, and put the pieces of the inter-parameter constraint information into one group. Similarly, the constraint decomposition unit 122 groups pieces of the inter-parameter constraint information for other combinations in such a way that each group contains pieces of the inter-parameter constraint information of the same combination.

Next, the constraint decomposition unit 122 applies the constraint expansion rule to the pieces of inter-parameter constraint information classified by parameter combination, and decomposes a constraint into constraints specified in association with unit blocks (step S33). The constraint decomposition unit 122 may apply a predetermined constraint expansion rule to a constraint the target range of which is wider than the unit block among constraints indicated by the classified inter-parameter constraint information, and decompose the constraint into constraints specified in association with unit blocks.

For example, when a constraint between the parameters "AA" and "BB" included in the pieces of inter-parameter constraint information in FIG. 4 is obtained as a result of classification, the constraint No. 1 with the target range "[1, 24]" is selected as a constraint to be decomposed. The constraint is decomposed into two constraints in such a way that the constraints are specified in association with unit blocks, and more specifically that the two constraints have different target ranges "[1, 16]" and "[17, 24]". Then, these constraints are connected by logical OR. At this time, the constraint expansion rule illustrated in FIG. 9 is applied to the constraint. The constraint expansion rule illustrated in FIG. 9 indicates that the constraint "the value associated with the target range "[a, c]" differs between two target parameters" is expanded to the logical OR of constraints between two unit blocks "either the value of the first unit block corresponding to the range "[a, b]" or the value of the second unit block corresponding to the range "[b+1, c]" differs between the two target parameters" based on information on the unit blocks of these target parameters. For example, the constraint expansion rule may specify such a combination of constraints between unit blocks, which is the result of decomposition of a constraint, for the constraint yet to be decomposed and the result (information on the unit blocks) of decomposition of a parameter included in the relevant set of target parameters. According to the constraint expansion rule, constraints specified between two or more target parameters can also be decomposed in the same manner.

The constraint decomposition unit 122 updates the entire constraint (logical expression) according to the logical relationships between decomposed constraints and constraints not subjected to decomposition, and reflects the result in the inter-parameter constraint information (step S34). The constraint decomposition unit 122 performs a series of such processing steps for all combinations of the classified parameters.

The inter-parameter constraint information in which the result has been reflected is output to the parameter classification unit 131.

Figure 19:
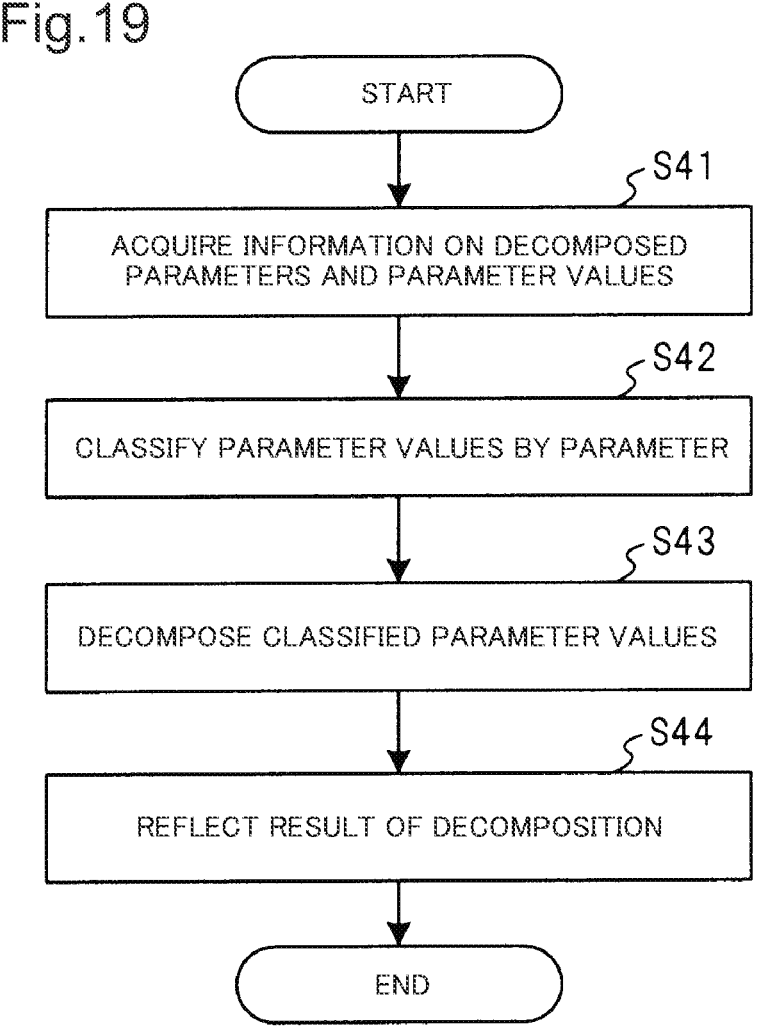
FIG. 19 is a flowchart illustrating a more detailed example of a parameter value decomposition operation to be performed by a parameter value decomposition unit 123.

FIG. 19 is a flowchart illustrating a more detailed example of a parameter value decomposition operation to be performed by the parameter value decomposition unit 123. The operation illustrated in FIG. 19 corresponds to a part of the requirement decomposition operation in step S12 described above.

In the example illustrated in FIG. 19, first, the parameter value decomposition unit 123 acquires, as inputs, the parameter information or parameter division information in which the result of decomposition of parameters into unit blocks has been reflected, and the parameter value information before decomposition (step S41).

Next, the parameter value decomposition unit 123 classifies all the pieces of acquired parameter value information by parameter (step S42).

Next, the parameter value decomposition unit 123 decomposes a parameter value into parameter values specified in association with unit blocks with respect to the parameter value information classified by parameter (step S43). The parameter value decomposition unit 123 may decompose a parameter value the target range of which is wider than the unit block among parameter values indicated by the parameter value conditions in the classified parameter value information, in such a way that the parameter value is decomposed into parameter values specified in association with unit blocks.

For example, when the parameter value information on the parameter "AA" included in the pieces of parameter value information in FIG. 5 is obtained as a result of classification, a parameter value indicated by the parameter value information No. 3 with the target range "[1, 24]" is selected as a parameter value to be decomposed. More specifically, the parameter value is decomposed into parameter value conditions for the different target ranges "[1, 16]" and "[17, 24]" so that a parameter value is specified for each unit block.

The example of decomposing parameter values illustrated in FIG. 12 is an example in which the parameter value "192.168.1 to 192.168.8" specified for the upper 24 bits is decomposed at the 16th bit, which is the boundary between the first unit block and the second unit block, according to the information on the first to third unit blocks shown as the result of decomposition of the parameter "AA" and as a result, the parameter value "192.168" of the first unit block and the parameter value "1 to 8" of the second unit block are obtained.

Finally, the parameter value decomposition unit 123 reflects the result of decomposition in the parameter value information (step S44). The parameter value decomposition unit 123 performs a series of such processing steps for all the classified parameters.

The parameter value information in which the result has been reflected is output to the parameter value assignment unit 132.

Figure 20:
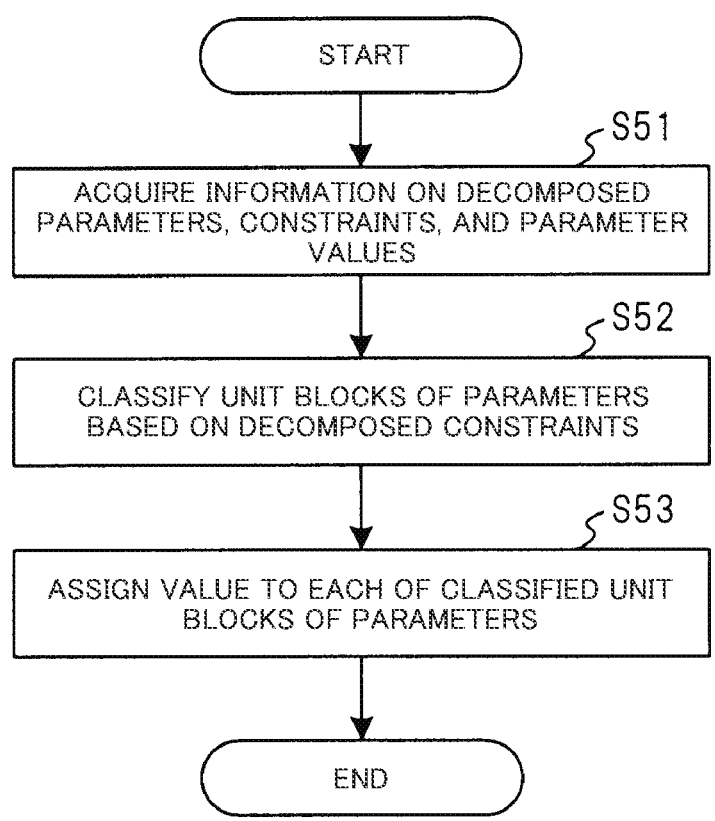
FIG. 20 is a flowchart illustrating a more detailed example of a parameter value assignment operation to be performed by an assignment unit 13.

FIG. 20 is a flowchart illustrating a more detailed example of a parameter value assignment operation to be performed by the assignment unit 13. The operation illustrated in FIG. 20 corresponds to the parameter value assignment operation in step S14 described above.

In the example illustrated in FIG. 20, first, the parameter classification unit 131 of the assignment unit 13 acquires, as inputs, the parameter information or parameter division information in which the result of decomposition of parameters into unit blocks has been reflected, and the inter-parameter constraint information in which decomposition into unit blocks has been completed (step S51).

Next, the parameter classification unit 131 classifies all the unit blocks of all the target parameters based on the constraints between the parameters subjected to the unit block decomposition (step S52).

For example, the parameter classification unit 131 may classify a group of unit blocks to be assigned a value into one or more unit classes by using an equal sign "=" on the basis of the unit blocks of the target parameter and information on constraints between the unit blocks derived by the parameter decomposition unit 121 and the constraint decomposition unit 122, and in addition, derive a graph in which the unit classes are connected by edges that clearly indicate information (inequality sign "≠") on the relationships between different unit classes.

The graph derived by the parameter classification unit 131 is output to the parameter value assignment unit 132.

Subsequently, when the parameter value assignment unit 132 acquires the graph showing the result of classifying the group of unit blocks of the parameter from the parameter classification unit 131, the parameter value assignment unit 132 assigns a parameter value to each unit block on the basis of the parameter value information after unit block decomposition (step S53).

Hereinafter, the above operation will be described by use of a specific example. First, assume that the parameter information illustrated in FIG. 2, the parameter division information illustrated in FIG. 3, the inter-parameter constraint information illustrated in (b) of FIG. 4, and the parameter value information illustrated in FIG. 5 are input as requirements.

In the requirement decomposition unit 12, the parameter decomposition unit 121 first combines parameter divisions for each target parameter on the basis of the requirements having been input. In the present example, the 16th bit ("{16}" in the drawing) and the 24th bit ("{24}" in the drawing) are given as the division positions of the IPv4 addresses having parameter names "AA" and "BB". The parameter decomposition unit 121 outputs parameter division information after decomposition indicating the division position "{16, 24}", as the combined parameter divisions of the parameters "AA" and "BB". The parameter decomposition unit 121 decomposes each of the parameters "AA" and "BB" into three unit blocks according to the combined parameter divisions obtained for the parameters "AA" and "BB".

FIG. 8 illustrates an example of the result of decomposition of parameters in the present example. The parameter decomposition unit 121 decomposes the parameters "AA" and "BB" into unit blocks on the basis of the input parameter information on the parameters "AA" and "BB" with reference to the combined parameter division positions for each parameter. In the present example, the parameter decomposition unit 121 divides each of the parameters "AA" and "BB" at the 16th-highest bit and the 24th-highest bit, to obtain three unit blocks.

After each target parameter is decomposed into unit blocks, the constraint decomposition unit 122 decomposes the inter-parameter constraints input as requirements into constraints associated with unit blocks.

In the present example, the constraint decomposition unit 122 acquires inter-parameter constraint information denoted by D31 in FIG. 11, and decomposes the inter-parameter constraint information into inter-parameter constraints of D33 indicated by a solid arrow in the drawing. At this time, as indicated by D32 in the drawing, the constraint decomposition unit 122 refers to the parameter information or parameter division information representing the result of decomposition into unit blocks. As illustrated in FIG. 11, the constraint decomposition unit 122 applies the constraint expansion rule to a constraint including a parameter combination common to inter-parameter constraints and partially including unit blocks of each parameter (that is, the target range and the unit block partially match) among the inter-parameter constraints having the common parameter combination, and decomposes the constraint into constraints specified in association with unit blocks. After the decomposition, the constraint decomposition unit 122 performs a logical operation (AND/OR operation) on the inter-parameter constraints having the common parameter combination, and updates the logical expression. In the present example, since there is a contradiction in a combination of the constraint No. 1-1 and the constraint No. 2, this combination is deleted, and finally, only a combination of the constraint No. 1-2 and the constraint No. 2 remains.

In parallel with the operation of the constraint decomposition unit 122, the parameter value decomposition unit 123 decomposes parameter values (more specifically, parameter values indicated by parameter value conditions) input as requirements into parameter values associated with unit blocks.

In the present example, the parameter value decomposition unit 123 acquires the parameter value information denoted by D41 in FIG. 12, and decomposes the parameter value information into the parameter value of D43 indicated by a solid arrow in the drawing. At this time, as indicated by D42 in the drawing, the parameter value decomposition unit 123 refers to the parameter information or parameter division information representing the result of decomposition into unit blocks. As illustrated in FIG. 12, the parameter value decomposition unit 123 decomposes a parameter value partially including unit blocks of the relevant parameter (that is, the target range and the unit block partially match) among parameter values having the common parameter name, into parameter values specified in association with unit blocks. In the present example, the parameter value decomposition unit 123 decomposes the parameter value No. 3 "192.168.1 to 192.168.8" associated with the target range "[1, 24]" into the parameter value "192.168" for the target range "[1, 16]" and the parameter value 1 to 8" for the target range "[17, 24]". While FIG. 12 illustrates only the parameter value information on the parameter "AA", the parameter value decomposition unit 123 also performs the same processing for the parameter "BB".

When decomposition of the requirements is completed by the requirement decomposition unit 12 in this manner, the parameter classification unit 131 of the assignment unit 13 classifies unit blocks of each target parameter based on the divided inter-parameter constraints, as illustrated in FIG. 14. In the present example, the first unit block of the parameter "AA" and the first unit block of the parameter "BB" are put together into one group on the assumption that the unit blocks should have the same value according to the inter-parameter constraint subjected to decomposition. Meanwhile, the second unit block of the parameter "AA" and the second unit block of the parameter "BB" are classified into different groups on the assumption that the unit blocks should have different values according to the inter-parameter constraint subjected to decomposition, and then intergroup connection is made in such a way as to indicate to that effect. Since there is no inter-parameter constraint for the third unit block of the parameter "AA" or the third unit block of the parameter "BB", these unit blocks may be classified into different groups or the same group. However, these unit blocks are classified into different groups here. In the present example, the parameter classification unit 131 performs grouping by using the Unionfind algorithm.

When classification of unit blocks of the target parameters is completed by the parameter classification unit 131, the parameter value assignment unit 132 assigns parameter values on the basis of the result of the classification and parameter value information after decomposition. The parameter value assignment unit 132 may assign a value to each unit block by using, for example, a graph coloring algorithm.

As described above, in the present example embodiment, the requirement decomposition unit 12 optimizes decomposition positions in parameters without manual intervention by scanning requirements having been input, and decomposes various requirements (constraints between parameters and/or parameter values to be assigned) according to the optimized division positions. Therefore, the parameter value assignment device 10 can efficiently assign correct parameter values even to various parameters for which division positions or the formats of requirement input are not fixed.

For example, according to the present example embodiment, since it is not necessary to manually arrange the format of requirements, it is possible to automatically and efficiently assign a correct parameter value even to a parameter, such as an IP address, which is not divided at a fixed position for parameter value assignment.

As an example, consider assigning values to IP addresses. When some adopt "192.168.*.*/16" as a network mask and some adopt "192.168.10.*/24 to 192.168.20.*/24" as a sub-network mask for an IP address to be assigned to each of a plurality of devices, IP addresses should be assigned in consideration of differences between the network masks. Such (partial) dependence relationships between IP addresses increase as the size of a system increases, and become difficult to manage manually. However, according to the present example embodiment, since it is not necessary to manually arrange the format of requirements, it is possible to efficiently assign a correct parameter value even to a parameter, such as an IP address, which is not divided at a fixed position for parameter value assignment.

When a requirement is decomposed into predetermined elements (for example, an IPv4 address is divided into four blocks of 8 bits each, and a URL is divided into a host part, a port part, and the like), there are cases where a block is not divided adaptively, as follows. For example, a block is further decomposed into smaller blocks even if a value can be assigned to the entire block (in the above example, the first to 16th-highest bit parts or the like of the IPv4 addresses "AA" and "BB"). In contrast, a block (for example, a block included in the host part of a URL, in which a server name is specified) that needs to be divided so as to be assigned values is not decomposed into blocks with sufficient granularity.

It is also conceivable that a requirement is not decomposed into predetermined elements and for example, a method using the greatest common divisor of per-element bit counts in the respective expression forms of a plurality of variables as targets is used as described in PTL 2. However, it is not always optimal, as a dividing method, to equally divide a requirement into elements with a bit length corresponding to the greatest common divisor, as described above. As an extreme but conceivable case, it is possible to cite a case where when a condition of a value is given to the highest bit of a parameter and another condition is given to the upper 16 bits of the parameter, the parameter may be divided into parts (16 parts in total) of 1 bit each if the greatest common divisor is used as in the method described in PTL 1. According to the present example embodiment, the parameter just needs to be decomposed into two parts of the highest bit and the following 15 bits. Such an inappropriate decomposition is undesirable since a huge increase in the calculation amount of a program is caused by decomposition of constraints, or the like, leading to an increase in processing load. In addition, since division is performed on the basis of a per-element bit count in the method described in PTL 2, the method is not applied to variable-length parameters, and lacks versatility.

Meanwhile, in the present example embodiment, since a unit block is determined for each target parameter according to a decomposition position indicated by a requirement having been input, there is no possibility of unnecessary decomposition as described above. Therefore, the processing load for decomposition of constraints is minimized, and correct parameter values are efficiently assigned. Furthermore, in the present example embodiment, since a unit block is determined for each target parameter according to a decomposition position indicated by a requirement having been input, the present example embodiment can also be applied to variable-length parameters without any particular problem.

Second Example Embodiment

Figure 21:
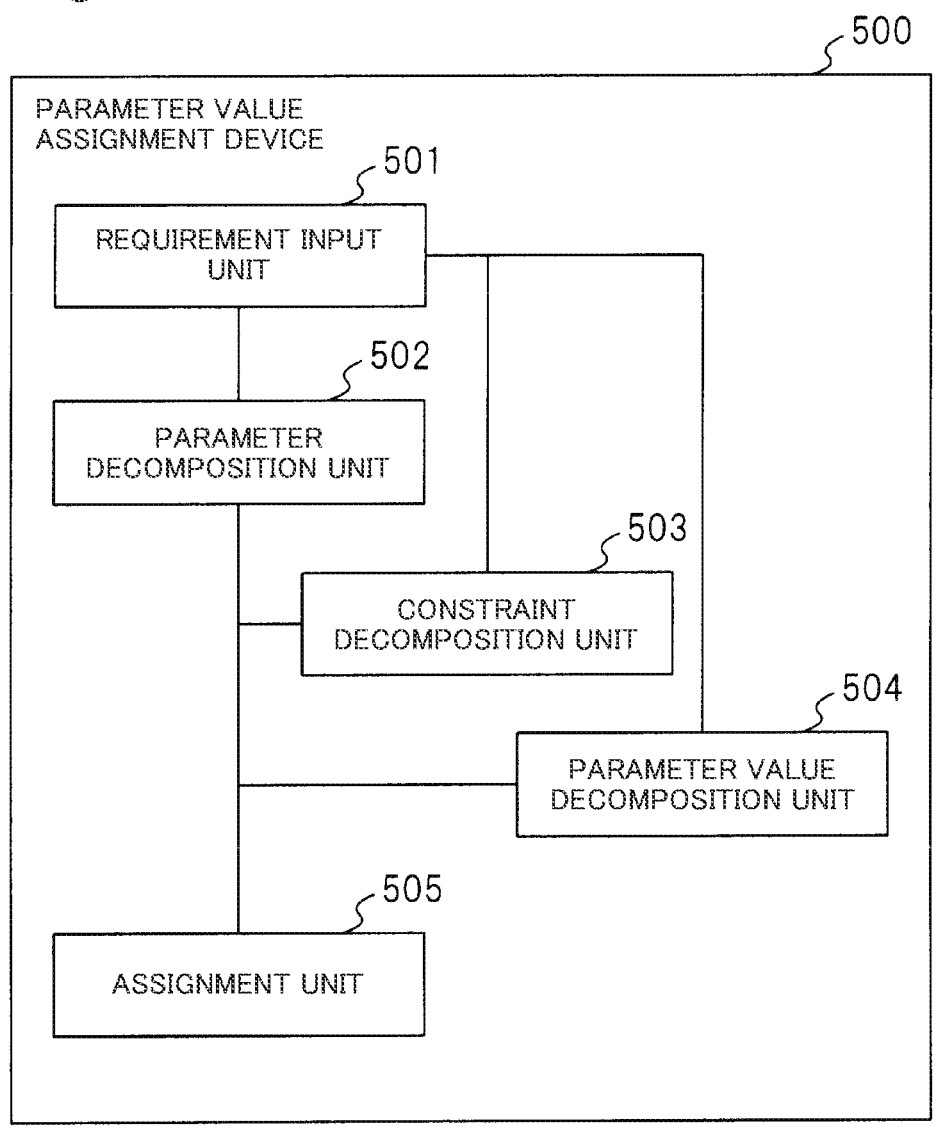
FIG. 21 is a block diagram illustrating an outline of a parameter value assignment device according to a second example embodiment of the present disclosure.

Next, a second example embodiment of the present disclosure will be described. FIG. 21 is a block diagram illustrating an outline of a parameter value assignment device according to the second example embodiment of the present disclosure. A parameter value assignment device 500 illustrated in FIG. 21 includes a requirement input unit 501, a parameter decomposition unit 502, a constraint decomposition unit 503, a parameter value decomposition unit 504, and an assignment unit 505.

The requirement input unit 501 inputs constraint information and parameter value information, as requirements related to value assignment to one or more parameters that are target parameters. The constraint information indicates a constraint between the target parameters or between any elements included in the target parameters. The parameter value information indicates parameter value conditions for the target parameters or the any elements.

The parameter decomposition unit 502 decomposes each of the target parameters into one or more unit blocks on the basis of information input as requirements.

The constraint decomposition unit 503 decomposes the constraint indicated by the constraint information into constraints between the unit blocks on the basis of the result of decomposition of the target parameters into the unit blocks, and reorganizes the constraints between the unit blocks, subjected to decomposition.

The parameter value decomposition unit 504 decomposes the parameter value conditions indicated by the parameter value information as requirements into parameter value conditions for the unit blocks on the basis of the result of decomposition of the target parameters into the unit blocks.

The assignment unit 505 assigns a value to each of the target parameters on the basis of the result of decomposition of the target parameters into the unit blocks, the constraints between the unit blocks, and the parameter value conditions for the unit blocks.

With such a configuration, a correct value can be assigned even to a parameter the configuration of which is not fixed according to a requirement having been input, while maintaining an original degree of freedom.

In the above configuration, the parameter decomposition unit 502 may extract a division position in each target parameter based on at least either information on a target range in the parameter to which a constraint indicated by the constraint information is applied or information on a target range in the parameter to which a parameter value condition indicated by the parameter value information is applied, combine parameter divisions corresponding to the extracted division positions, and decompose each target parameter into one or more unit blocks.

The constraint information may include information on one or more parameters having a constraint relationship, information on a target range in each parameter to which the constraint relationship is applied, and information on a constraint to be applied. The constraint may include an equal or unequal relationship between values. The parameter value information may include information on a parameter as an assignment target, information on a target range in the parameter, and a condition for a parameter value to be assigned to the target range.

When the constraint information includes a constraint defined in such a way that the target range in the parameter having the constraint relationship is wider than a unit block at a corresponding position in the parameter, the constraint decomposition unit 503 may decompose the constraint.

The requirement input unit 501 may further input, as requirements, parameter division information including information on a parameter to be divided and information on any one or more division positions in the parameter. The parameter decomposition unit 502 may extract the division positions in each target parameter based on the information input as requirements including the parameter division information, combine parameter divisions corresponding to the extracted division positions, and decompose each target parameter into one or more unit blocks.

The parameter decomposition unit 502 may combine the parameter divisions by performing a union operation of the division positions in each target parameter indicated by the information input as requirements, and divide each target parameter at a last remaining division position.

As with the assignment unit 13 illustrated in FIG. 1, the assignment unit 505 may also include a parameter classification unit and a value assignment unit. The parameter classification unit classifies all the unit blocks of the target parameters based on the result of decomposition of the target parameters into the unit blocks and the constraints between the unit blocks. The value assignment unit assigns a value to each of the classified unit blocks based on the result of classification of the unit blocks and the parameter value conditions for the unit blocks.

In such a configuration, the parameter classification unit may classify all the unit blocks of the target parameters into one or more groups in such a way that unit blocks to be assigned the same value are grouped together, and derive a graph in which the groups after classification are connected by an edge indicating the relationship between the groups. The value assignment unit may assign a value to each of the classified unit blocks on the basis of the groups of the unit blocks and the relationship between the groups of the unit blocks indicated by the graph, and the parameter value conditions for the unit blocks.

Figure 22:
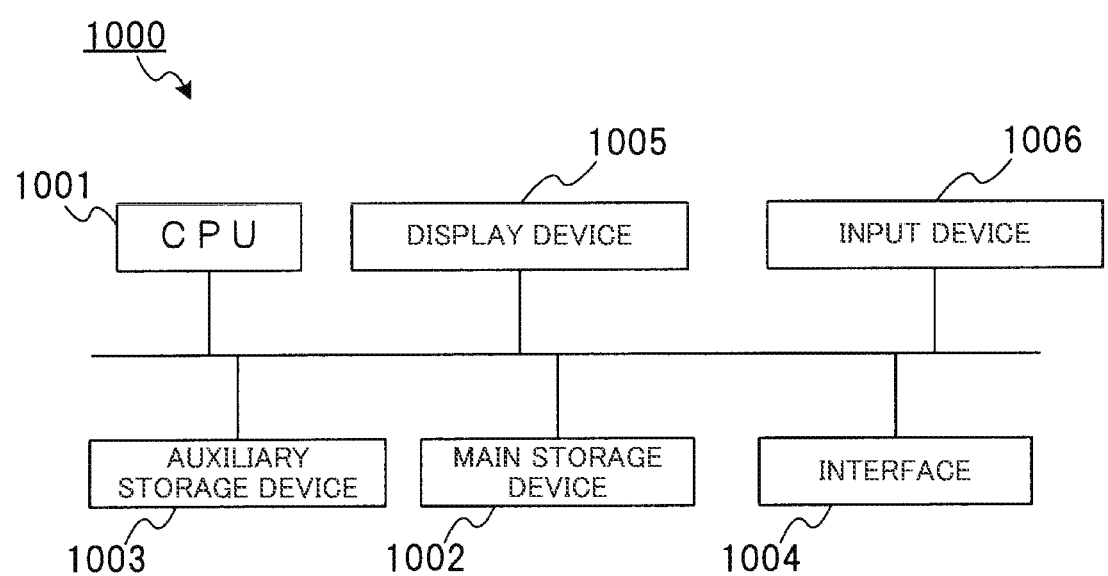
FIG. 22 is a schematic block diagram illustrating a configuration example of a computer according to the example embodiments of the present disclosure.

FIG. 22 is a schematic block diagram illustrating a configuration example of a computer according to each example embodiment of the present disclosure. A computer 1000 includes a central processing unit (CPU) 1001, a main storage device 1002, an auxiliary storage device 1003, an interface 1004, a display device 1005, and an input device 1006.

The example embodiments described above may be implemented in the computer 1000. In such a case, operation of the device may be stored in the form of a program in the auxiliary storage device 1003. The CPU 1001 reads the program from the auxiliary storage device 1003, deploys the program in the main storage device 1002, and executes predetermined processing in the example embodiments according to the program. The CPU 1001 is an example of an information processing apparatus that operates according to a program, and may include, for example, a micro processing unit (MPU), a memory control unit (MCU), and/or a graphics processing unit (GPU) in addition to the CPU.

The auxiliary storage device 1003 is an example of a non-transitory tangible medium. Examples of a non-transitory tangible medium also include magnetic disks, magneto-optical disks, CD-ROMs, DVD-ROMs, and semiconductor memories, connected via the interface 1004. In the case where the program is delivered to the computer 1000 via a communication line, the computer 1000 that has received the delivered program may deploy the program in the main storage device 1002 and execute the predetermined processing in each example embodiment.

The program may be for implementing a part of the predetermined processing in the example embodiments. Furthermore, the program may be a differential program that implements the predetermined processing in the example embodiments in combination with other programs already stored in the auxiliary storage device 1003.

The interface 1004 transmits and receives information to and from other devices. The display device 1005 presents the information to a user. The input device 1006 receives input of information from the user.

Depending on processing details in the example embodiments, some elements of the computer 1000 may be omitted. For example, if the computer 1000 does not present information to the user, the display device 1005 may be omitted. For example, if the computer 1000 does not receive information input from the user, the input device 1006 may be omitted.

Some or all of the above constituent elements are implemented by general or dedicated circuitry, processors or the like, or combinations thereof. These elements may include a single chip or a plurality of chips connected via a bus. Furthermore, some or all of the above constituent elements may be implemented by a combination of the above-described circuitry or the like and programs.

In the case where some or all of the above constituent elements are implemented by a plurality of information processing apparatuses, circuitry, or the like, the plurality of information processing apparatuses, circuitry, or the like may be arranged in a centralized manner or in a decentralized manner. For example, the information processing apparatuses, the circuitry, or the like may be implemented as a client and server system, a cloud computing system, or the like, in which the information processing apparatuses, the circuitry, or the like are connected via a communication network.

While the present disclosure has been particularly shown and described with reference to example embodiments thereof, the present disclosure is not limited to these embodiments. It will be understood by those of ordinary skill in the art that various changes in form and details may be made therein without departing from the spirit and scope of the present disclosure as defined by the claims.

This application is based upon and claims the benefit of priority from Japanese patent application No. 2018-158971, filed on Aug. 28, 2018, the disclosure of which is incorporated herein in its entirety by reference.

INDUSTRIAL APPLICABILITY

The present disclosure is suitable for application to automatic assignment of a value to a parameter the configuration of which is not fixed.

REFERENCE SIGNS LIST 10 parameter value assignment device
11 requirement input unit
12 requirement decomposition unit
121 parameter decomposition unit
122 constraint decomposition unit
123 parameter value decomposition unit
13 assignment unit
131 parameter classification unit
132 parameter value assignment unit
14 output unit
500 parameter value assignment device
501 requirement input unit
502 parameter decomposition unit
503 constraint decomposition unit
504 parameter value decomposition unit
505 assignment unit
1000 computer
1001 CPU
1002 main storage device
1003 auxiliary storage device
1004 interface
1005 display device
1006 input device

What is claimed is:

1. A parameter value assignment device comprising:
a memory storing instructions; and
one or more processors configured to execute the instructions to:
input constraint information and parameter value information as requirements related to value assignment to one or more parameters that are target parameters, the constraint information indicating a constraint between the target parameters or between any elements included in the target parameters, the parameter value information indicating parameter value conditions for the target parameters or the any elements;
decompose each of the target parameters into one or more unit blocks based on the constraint information input as the requirements;
decompose the constraint indicated by the constraint information into constraints between the one or more unit blocks based on a result of decomposition of the target parameters into the one or more unit blocks, and reorganize the constraints between the one or more unit blocks, subjected to decomposition;
decompose the parameter value conditions indicated by the parameter value information as the requirements into parameter value conditions for the one or more unit blocks based on the result of decomposition of the target parameters into the one or more unit blocks; and
assign a value to each of the target parameters based on the result of decomposition of the target parameters into the one or more unit blocks, the constraints between the one or more unit blocks, and the parameter value conditions for the one or more unit blocks.

2. The parameter value assignment device according to claim 1, wherein the one or more processors are further configured to execute the instructions to:
extract a division position in each target parameter based on at least either information on a target range in the parameter to which the constraint indicated by the constraint information is applied or information on a target range in the parameter to which the parameter value condition indicated by the parameter value information is applied, combines parameter divisions corresponding to the extracted division positions, and decomposes each target parameter into one or more unit blocks.

3. The parameter value assignment device according to claim 2, wherein the one or more processors are further configured to execute the instructions to:
combine the parameter divisions by performing a union operation of the division positions in each target parameter indicated by the constraint information input as the requirements, and divide each target parameter at a last remaining division position.

4. The parameter value assignment device according to claim 1, wherein
the constraint information includes information on one or more parameters having a constraint relationship, information on a target range in each parameter to which the constraint relationship is applied, and information on a constraint to be applied,
the constraint includes an equal or unequal relationship between values, and
the parameter value information includes information on a parameter as an assignment target, information on a target range in the parameter, and a condition for a parameter value to be assigned to the target range.

5. The parameter value assignment device according to claim 4, wherein the one or more processors are further configured to execute the instructions to:
decompose the constraint when the constraint information includes a constraint defined in such a way that the target range in the parameter having the constraint relationship is wider than a unit block at a corresponding position in the parameter.

6. The parameter value assignment device according to claim 1, wherein the one or more processors are further configured to execute the instructions to:
input, as the requirements, parameter division information including information on a parameter to be divided and information on any one or more division positions in the parameter, and
extract the division positions in each target parameter based on the constraint information input as the requirements, including the parameter division information, combine parameter divisions corresponding to the extracted division positions, and decompose each target parameter into the one or more unit blocks.

7. The parameter value assignment device according to claim 1, wherein the one or more processors are further configured to execute the instructions to:
classify all the one or more unit blocks of the target parameters based on the result of decomposition of the target parameters into the one or more unit blocks and the constraints between the one or more unit blocks; and
assign a value to each of the classified unit blocks based on a result of classification of the one or more unit blocks and the parameter value conditions for the one or more unit blocks.

8. The parameter value assignment device according to claim 7, wherein the one or more processors are further configured to execute the instructions to:

classify all the one or more unit blocks of the target parameters into one or more groups in such a way that unit blocks to be assigned a same value are grouped together, and derive a graph in which the groups after classification are connected by an edge indicating a relationship between the groups, and assign a value to each of the classified unit blocks based on the groups of the one or more unit blocks and the relationship between the groups of the one or more unit blocks indicated by the graph, and the parameter value conditions for the one or more unit blocks.

9. A parameter value assignment method to be performed by an information processing apparatus, the method comprising:

receiving constraint information and parameter value information input as requirements related to value assignment to one or more parameters that are target parameters, the constraint information indicating a constraint between the target parameters or between any elements included in the target parameters, the parameter value information indicating parameter value conditions for the target parameters or the any elements;

decomposing each of the target parameters into one or more unit blocks based on the constraint information input as the requirements;

decomposing the constraint indicated by the constraint information into constraints between the one or more unit blocks based on a result of decomposition of the target parameters into the one or more unit blocks, and reorganizing the constraints between the one or more unit blocks, subjected to decomposition;

decomposing the parameter value conditions indicated by the parameter value information as the requirements into parameter value conditions for the one or more unit blocks based on the result of decomposition of the target parameters into the one or more unit blocks; and assigning a value to each of the target parameters based on the result of decomposition of the target parameters into the one or more unit blocks, the constraints between the one or more unit blocks, and the parameter value conditions for the one or more unit blocks.

10. A non-transitory computer-readable recording medium on which a parameter value assignment program is recorded, the program causing a computer to:

receive constraint information and parameter value information input as requirements related to value assignment to one or more parameters that are target parameters, the constraint information indicating a constraint between the target parameters or between any elements included in the target parameters, the parameter value information indicating parameter value conditions for the target parameters or the any elements;

decompose each of the target parameters into one or more unit blocks based on the constraint information input as the requirements;

decompose the constraint indicated by the constraint information into constraints between the one or more unit blocks based on a result of decomposition of the target parameters into the one or more unit blocks, and reorganize the constraints between the one or more unit blocks, subjected to decomposition;

decompose the parameter value conditions indicated by the parameter value information as the requirements into parameter value conditions for the one or more unit blocks based on the result of decomposition of the target parameters into the one or more unit blocks; and assign a value to each of the target parameters based on the result of decomposition of the target parameters into the one or more unit blocks, the constraints between the one or more unit blocks, and the parameter value conditions for the one or more unit blocks.

* * * * *